United States Patent
Shinde

(10) Patent No.: US 12,299,617 B1
(45) Date of Patent: May 13, 2025

(54) EFFICIENTLY SOLVING MULTI-OBJECTIVE HIERARCHICAL LINEAR PROGRAMMING PROBLEMS

(71) Applicant: Blue Yonder Group, Inc., Scottsdale, AZ (US)

(72) Inventor: Vishal Shinde, Bangaluru (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 299 days.

(21) Appl. No.: 17/538,476

(22) Filed: Nov. 30, 2021

Related U.S. Application Data

(60) Provisional application No. 63/122,568, filed on Dec. 8, 2020.

(51) Int. Cl.
| | | |
|---|---|---|
| *G06Q 10/0633* | (2023.01) | |
| *G06F 17/16* | (2006.01) | |
| *G06N 3/126* | (2023.01) | |
| *G06Q 10/08* | (2024.01) | |

(52) U.S. Cl.
CPC ......... *G06Q 10/0633* (2013.01); *G06F 17/16* (2013.01); *G06N 3/126* (2013.01)

(58) Field of Classification Search
CPC ........... G06Q 10/06315; G06Q 10/067; G06Q 10/087
See application file for complete search history.

(56) References Cited

U.S. PATENT DOCUMENTS

| | | | |
|---|---|---|---|
| 7,672,862 B1* | 3/2010 | Venkatasubramanyan | ................... G06Q 10/08 705/7.22 |
| 8,429,035 B1* | 4/2013 | Kamath | ................. G06Q 10/06 705/28 |
| 11,875,289 B1* | 1/2024 | Shinde | ............. G06Q 10/06315 |
| 11,995,588 B1* | 5/2024 | Nandeda | .............. G06Q 10/087 |

(Continued)

OTHER PUBLICATIONS

J.M. Spitter et al., "Linear programming models with planned lead times for supply chain operation planning, European Journal of Operational Research", vol. 163, Issue 3, 2005, pp. 706-720, ISSN 0377-2217, https://doi.org/10.1016/j.ejor.2004.01.019.(https://www.sciencedirect.com/science/article/pii/S0377221.*

(Continued)

*Primary Examiner* — Renae Feacher
(74) *Attorney, Agent, or Firm* — Spencer Fane LLP; Steven J. Laureanti

(57) ABSTRACT

A system and method efficiently solve subsequent runs of a supply chain planning problem modeled as a multi-objective hierarchical linear programming problem. Embodiments include modeling a supply chain planning problem as a multi-objective hierarchal linear programming problem having first Run1 objectives and based, at least in part, on supply chain input data, receiving one or more changes to the supply chain input data, modeling a second supply chain planning problem based, at least in part, on the one or more changes to the supply chain input data, and modeled as a second multi-objective hierarchal linear programming prob- (Continued)

lem having Run2 objectives, generating a superset matrix, and generating a supply chain plan comprising the one or more changes to the supply chain input data by converting a solution of the second supply chain planning problem.

20 Claims, 20 Drawing Sheets

(56) References Cited

U.S. PATENT DOCUMENTS

2013/0238385 A1* 9/2013 Kamath ............. G06Q 10/0633
705/7.27
2017/0109631 A1* 4/2017 Cheng .................. G06Q 10/047
2017/0364847 A1* 12/2017 Kamath ............. G06Q 10/0633

OTHER PUBLICATIONS

Mastrrocinque et al., "A Multi-objective optimization for supply chain network using bees algorithm," InTech, International Journal of Engineering Business Management, May 20, 2013.*

* cited by examiner

| SR. NO. | FUNCTIONAL CHANGE | CORRESPONDING CHANGE IN LPP | RETAINS PRIMAL FEASIBILITY | RETAINS DUAL FEASIBILITY |
|---|---|---|---|---|
| 1 | ADDING NEW DEMAND (NON-LATEABLE) | ADD NEW VARIABLE | YES | NO |
| 2 | CHANGE DEMAND PRIORITY | CHANGE OBJECTIVE COEFFICIENT | YES | NO |
| 3 | CHANGE DEMAND NeedQty | CHANGE UPPER BOUND | NO | YES |
| 4 | CHANGE DEMAND NeedDate | ADD NEW VARIABLE, CHANGE OBJECTIVE COEFFICIENT AND CHANGE UPPER BOUND | NO | NO |
| 5 | ADDING NEW DEMAND (LATEABLE) | ADD NEW VARIABLE AND ADD NEW CONSTRAINT CONSISTING OF ONLY NEW VARIABLES | YES | NO |
| 6 | ADDING WORK-IN-PROGRESS (WIP) | CHANGE RIGHT HAND SIDE VALUE | NO | YES |
| 7 | CHANGE WIP QTY | CHANGE RIGHT HAND SIDE VALUE | NO | YES |
| 8 | CHANGE WIP DATE | CHANGE RIGHT HAND SIDE VALUE | NO | YES |
| 9 | CHANGE RESOURCE CAPACITY | CHANGE UPPER BOUND | NO | YES |
| 10 | FIX OPERATION PLAN QTY | CHANGE UPPER AND LOWER BOUND | NO | YES |

| 1202 | 1204 | 1206 | 1208 | 1210 | 1212 | 1214 | 1216 |
|---|---|---|---|---|---|---|---|
| EXP. NO. | DATASET | METHOD 400 RunTime (IN SECS) | METHOD 900 RunTime (IN SECS) | METHOD 900 X TIMES IMPROV | METHOD 900 % TIME REQUIRED | METHOD 1100 RunTime (IN SECS) | METHOD 1100 X TIMES IMPROV |
| 1 | DATASET 1 | 3823 | 2336 | 1.64 | 61.10 | 504 | 7.59 |
| 2 | | 3715 | 555 | 6.69 | 14.94 | 243 | 15.29 |
| 3 | | 3595 | 9 | 399.44 | 0.25 | 245 | 14.67 |
| 4 | | 5045 | 5387 | 0.94 | 106.78 | 7180 | 0.70 |
| 5 | | 3609 | 1616 | 2.23 | 44.78 | 238 | 15.16 |
| 6 | | 3320 | 10 | 332.00 | 0.30 | 245 | 13.55 |
| 7 | DATASET 2 | 1544 | 55 | 28.07 | 3.56 | 174 | 8.87 |
| 8 | | 1496 | 47 | 31.83 | 3.14 | 172 | 8.70 |
| 9 | | 1347 | 45 | 29.93 | 3.34 | 156 | 8.63 |
| 10 | | 1369 | 721 | 1.90 | 52.67 | 161 | 8.50 |
| 11 | | 1348 | 52 | 25.92 | 3.86 | 175 | 7.70 |
| 12 | | 1414 | 52 | 27.19 | 3.68 | 177 | 7.99 |
| 13 | DATASET 3 | 1076 | 57 | 18.88 | 5.30 | 186 | 5.78 |
| 14 | | 958 | 47 | 20.38 | 4.91 | 179 | 5.35 |
| 15 | | 1100 | 54 | 20.37 | 4.91 | 168 | 6.55 |
| 16 | | 895 | 50 | 17.90 | 5.59 | 170 | 5.26 |
| 17 | | 1038 | 50 | 20.76 | 4.82 | 186 | 5.58 |
| 18 | | 957 | 49 | 19.53 | 5.12 | 185 | 5.17 |

| METHOD 1100 % TIME TAKEN | DEMAND ADDITION | DEMAND NeedDate CHANGE | DEMAND NeedQty CHANGE | DEMAND PRIORITY CHANGE | CAPACITY CHANGE | WIP CHANGE | FIXED OP PLAN |
|---|---|---|---|---|---|---|---|
| 13.18 | ▨ | | | | | | |
| 6.54 | | ▨ | | | | | |
| 6.82 | | | | | | | |
| 142.32 | | | | | ▨ | | |
| 6.59 | | | | | | | |
| 7.38 | | | | | | | |
| 11.27 | ▨ | | | | | | |
| 11.50 | | | ▨ | | | | |
| 11.58 | | | | ▨ | | | |
| 11.76 | | | | | ▨ | | |
| 12.98 | | | | | | ▨ | |
| 12.52 | | | | | | | ▨ |
| 17.29 | ▨ | | | | | | |
| 18.68 | | | ▨ | | | | |
| 15.27 | | | | ▨ | | | |
| 18.99 | | | | | ▨ | | |
| 17.92 | | | | | | ▨ | |
| 19.33 | | | | | | | ▨ |

FROM FIG. 12A

| EXP. NO. 1302 | DATASET 1304 | METHOD 400 RunTime (IN SECS) 1306 | METHOD 1100 RunTime (IN SECS) 1308 | METHOD 1100 X TIMES IMPROV 1310 | METHOD 1100 % TIME TAKEN 1312 | WIP CHANGE 1314 |
|---|---|---|---|---|---|---|
| 1 | DATASET A | 1571 | 451 | 3.5 | 28.7 | Day1 WIPs CARRIED FORWARD TO Day2. Day2 WIPs SET TO ZERO |
| 2 | | 1402 | 555 | 2.5 | 39.6 | Day1 WIPs CARRIED FORWARD TO Day2 AFTER SCALING BY 100%-105%-110% WITH EQUAL DISTRIBUTION. Day2 WIPs SET TO ZERO |
| 3 | | 1779 | 709 | 2.5 | 39.9 | Day1 WIPs CARRIED FORWARD TO Day2 AFTER SCALING BY 100%-105%-110% WITH EQUAL DISTRIBUTION. Day2 WIPs SET TO ZERO |
| 4 | | 1581 | 551 | 2.9 | 34.9 | Day1 WIPs CARRIED FORWARD TO Day2 AFTER SCALING BY 100%-105%-110% WITH EQUAL DISTRIBUTION. Day2 WIPs SET TO ZERO |
| 5 | DATASET B | 958 | 242 | 4.0 | 25.3 | Day1 WIPs CARRIED FORWARD TO Day2. Day2 WIPs SET TO ZERO |
| 6 | | 869 | 525 | 1.7 | 60.4 | Day1 WIPs CARRIED FORWARD TO Day2 AFTER SCALING BY 100%-105%-110% WITH EQUAL DISTRIBUTION. Day2 WIPs SET TO ZERO |
| 7 | | 951 | 462 | 2.1 | 48.6 | Day1 WIPs CARRIED FORWARD TO Day2 AFTER SCALING BY 100%-105%-110% WITH EQUAL DISTRIBUTION. Day2 WIPs SET TO ZERO |
| 8 | | 1001 | 528 | 1.9 | 52.7 | Day1 WIPs CARRIED FORWARD TO Day2 AFTER SCALING BY 100%-105%-110% WITH EQUAL DISTRIBUTION. Day2 WIPs SET TO ZERO |
| 9 | DATASET C | 17439 | 710 | 24.6 | 4.1 | Day1 WIPs CARRIED FORWARD TO Day2. Day2 WIPs SET TO ZERO |
| 10 | | 14091 | 1018 | 13.8 | 7.2 | Day1 WIPs CARRIED FORWARD TO Day2 AFTER SCALING BY 100%-105%-110% WITH EQUAL DISTRIBUTION. Day2 WIPs SET TO ZERO |
| 11 | | 15008 | 1016 | 14.8 | 6.8 | Day1 WIPs CARRIED FORWARD TO Day2 AFTER SCALING BY 100%-105%-110% WITH EQUAL DISTRIBUTION. Day2 WIPs SET TO ZERO |

FIG. 13A

| DEMAND CHANGE | OPERATION PLAN CHANGE |
|---|---|
| Day2 DEMANDS' NeedQty RANDOMLY CHANGED TO 0%-50%-55%-65%-70%-120% WITH EQUAL DISTRIBUTION | Day1 OPERATION PLANS SET TO ZERO |
| Day2 DEMANDS' NeedQty RANDOMLY CHANGED TO 10%-20%-30%-40%-50%-80% WITH EQUAL DISTRIBUTION | Day1 OPERATION PLANS SET TO ZERO |
| Day2 DEMANDS' NeedQty RANDOMLY CHANGED TO 0%-90%-100%-120%-140%-160% WITH EQUAL DISTRIBUTION | Day1 OPERATION PLANS SET TO ZERO |
| Day2 DEMANDS' NeedQty RANDOMLY CHANGED TO 0%-60%-70%-80%-90%-110% WITH EQUAL DISTRIBUTION | Day1 OPERATION PLANS SET TO ZERO |
| Day2 DEMANDS' NeedQty RANDOMLY CHANGED TO 0%-50%-55%-65%-70%-120% WITH EQUAL DISTRIBUTION | Day1 OPERATION PLANS SET TO ZERO |
| Day2 DEMANDS' NeedQty RANDOMLY CHANGED TO 10%-20%-30%-40%-50%-80% WITH EQUAL DISTRIBUTION | Day1 OPERATION PLANS SET TO ZERO |
| Day2 DEMANDS' NeedQty RANDOMLY CHANGED TO 0%-90%-100%-120%-140%-160% WITH EQUAL DISTRIBUTION | Day1 OPERATION PLANS SET TO ZERO |
| Day2 DEMANDS' NeedQty RANDOMLY CHANGED TO 0%-60%-70%-80%-90%-110% WITH EQUAL DISTRIBUTION | Day1 OPERATION PLANS SET TO ZERO |
| Day2 DEMANDS' NeedQty RANDOMLY CHANGED TO 0%-50%-55%-65%-70%-120% WITH EQUAL DISTRIBUTION | Day1 OPERATION PLANS SET TO ZERO |
| Day2 DEMANDS' NeedQty RANDOMLY CHANGED TO 10%-20%-30%-40%-50%-80% WITH EQUAL DISTRIBUTION | Day1 OPERATION PLANS SET TO ZERO |
| Day2 DEMANDS' NeedQty RANDOMLY CHANGED TO 0%-90%-100%-120%-140%-160% WITH EQUAL DISTRIBUTION | Day1 OPERATION PLANS SET TO ZERO |

FROM FIG. 13A

FIG. 13B

1702 — 1. Prepare mapping between:
    'Run1 variable names' and 'Supply Chain Names of Run1 variable names'

1704 — 2. Prepare mapping between:
    'Run2 variable names' and 'Supply Chain Names of Run2 variable names'

1706 — 3. Perform Set Operations:

(i) Set of Run1 Supply Chain Names ∩ Set of Run2 Supply Chain Names = Set_Common_SupplyChainNames
→ This will give us 'Common Variables in Run1 and Run2'

(ii) Set of Run1 Supply Chain Names - Set_Common_SupplyChainNames
→ This will give us 'Only Run1 variables'

(iii) Set of Run2 Supply Chain Names - Set_Common_SupplyChainNames
→ This will give us 'Only Run2 variables'

1708 — 4. Same procedure (Step1 to Step3) to be repeated for 'Constraints' to find Common/ Only Run1/ Only Run2 constraints 1710 — 5. Deep Compare:
Common Vars and Common Constrs from previous steps, did not consider 'changes in Constraint Coefficients'

Additional check to correct Common Var/Constr lists >

Calculate and compare a score (which is based on Constr coeffs) for common vars/constrs in Run1 vs Run2

• Score of a Run1 Var=
SUM of (Constraint Coefficient of Run1 Var in a Run1 constraint which constrains this var *Position index of the constraint)

• Score of a Run2 Var=
SUM of (Constraint Coefficient of Run2 Var in a Run2 constraint which constrains this var *Position index of the constraint)

Position index of a constraint -> Index of the constraint's supply chain name in 'List of Common Supply Chain Names'. Hence- Position index of common constraints would be same.

Comparison of scores gives us 'Corrected Lists of Common/ Only Run1/ Only Run2 Variables'.

Same procedure to be followed for Constraints.

FIG. 17

| SR NO | DATASET | METHOD OF FIGURE 4 SOLVE TIME (sec). | UNIVERSAL METHOD SOLVE TIME (sec). | % TIME SAVED | X-times IMPROVEMENT |
|---|---|---|---|---|---|
| 1 | Dataset1 | 1821 | 608 | 66.61 | 3.00 |
| 2 | Dataset2 | 1478 | 633 | 57.17 | 2.33 |
| 3 | Dataset3 | 930 | 664 | 28.60 | 1.40 |
| 4 | Dataset4 | 1253 | 864 | 31.05 | 1.45 |
| 5 | Dataset5 | 11394 | 9993 | 12.30 | 1.14 |
| 6 | Dataset6 | 18408 | 43617 | -136.95 | 0.42 |
| 7 | Dataset7 | 1825 | 978 | 46.41 | 1.87 |
| 8 | Dataset8 | 1778 | 1073 | 39.65 | 1.66 |
| 9 | Dataset9 | 1253 | 864 | 31.05 | 1.45 |
| 10 | Dataset10 | 35626 | 38780 | -8.85 | 0.92 |

EFFICIENTLY SOLVING MULTI-OBJECTIVE HIERARCHICAL LINEAR PROGRAMMING PROBLEMS

CROSS REFERENCE TO RELATED APPLICATIONS

The present disclosure is related to that disclosed in the U.S. Provisional Application No. 63/122,568, filed Dec. 8, 2020, entitled "Efficiently Solving Multi-Objective Hierarchical Linear Programming Problems." U.S. Provisional Application No. 63/122,568 is assigned to the assignee of the present application. The present invention hereby claims priority under 35 U.S.C. § 119(e) to U.S. Provisional Application No. 63/122,568.

TECHNICAL FIELD

The present disclosure relates generally to supply chain planning and specifically to systems and methods of solving supply chain planning problems modeled as multi-objective hierarchical linear programming problems.

BACKGROUND

During supply chain planning, a supply chain plan may be generated by solving a supply chain planning problem modeled as a single- or multi-objective linear programming problem (LPP). For example, a supply chain planner may model a master production problem as a multi-objective hierarchical LPP. The supply chain planner may update and re-solve the supply chain planning problem from time-to-time when changes occur in the supply chain. However, even when there are few changes to the supply chain and these changes are known, re-solving the supply chain planning problem may take as much time to solve as the initial supply chain planning problem. This inefficiency to re-solve a previously-solved supply chain problem when there are only a few known changes to a supply chain is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures

FIG. 6 illustrates a chart of changes to a supply chain and a supply chain planning problem and the resultant effect on retaining primal or dual feasibility, in accordance with an embodiment;

FIGS. 12A and 12B illustrate chart results of solving multi-objective hierarchical LPP with micro-changes between a base run and a current run, in accordance with an embodiment;

FIGS. 13A and 13B illustrate a chart of results with macro-changes between a base run and a current run, in accordance with an embodiment;

FIG. 17 illustrates the matrix diff method, according to an embodiment;

DETAILED DESCRIPTION

Figure 1:
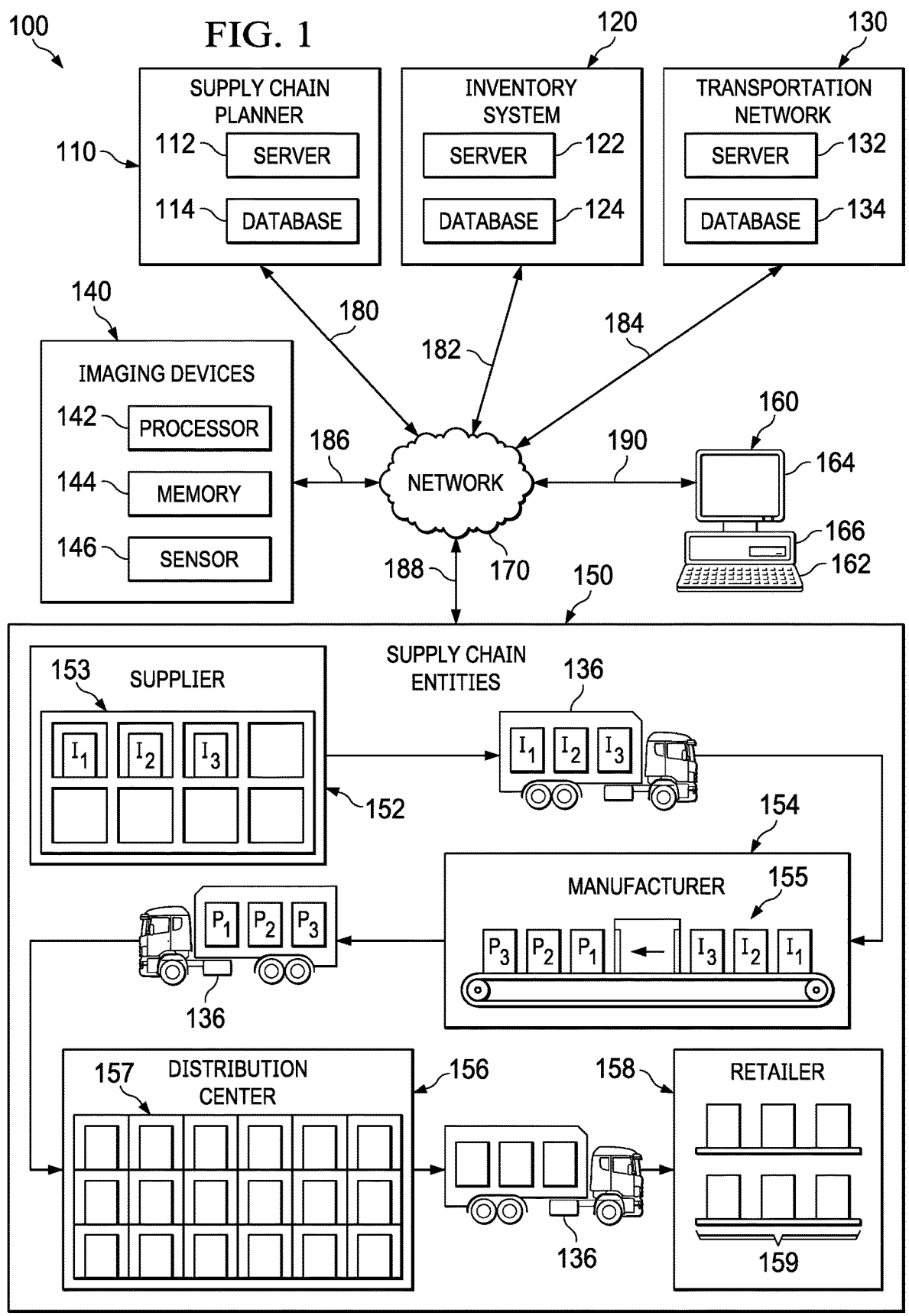
FIG. 1 illustrates a supply chain network, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

During supply chain planning, a supply chain plan may be generated by modeling and solving a supply chain planning problem as a linear programming problem (LPP). Although this approach may generate optimal solutions, LPPs must be re-solved from time-to-time due to changes in the supply chain. Embodiments of the following disclosure significantly reduce the runtime of re-solving the supply chain planning problem after changes in the supply chain by using the optimal basis of a previous or earlier solve of the supply chain planning problem.

FIG. 1 illustrates supply chain network, in accordance with a first embodiment. Supply chain network 100 comprises supply chain planner 110, inventory system 120, transportation network 130, one or more imaging devices 140, one or more supply chain entities 150, computer 160, network 170, and communication links 180-190. Although a single supply chain planner 110, a single inventory system 120, a single transportation network 130, one or more imaging devices 140, one or more supply chain entities 150, a single computer 160, a single network 170, and one or more communication links 180-190 are shown and described, embodiments contemplate any number of supply chain planners, inventory systems, transportation networks, imaging devices, supply chain entities, computers, networks, and communication links, according to particular needs.

In one embodiment, supply chain planner 110 comprises server 112 and database 114. Server 112 comprises one or more modules that model, generate, and solve a supply chain planning problem to produce a supply chain plan as a solution to a multi-objective LPP. According to embodiments, solver 204 (FIG. 2) of supply chain planner 110 uses solution information from a previous solving run of a multi-objective hierarchical LPP to increase the efficiency of a subsequent solving run of the multi-objective hierarchical linear programming problem. As described in more detail herein, solver 204 solves a lower-priority objective using the optimal basis and a list of variables to be fixed at their upper and/or lower bounds generated during the solve of one or more higher-priority objectives.

In addition, solver 204 uses the optimal basis and the list of variables generated from an earlier solving run of the multi-objective hierarchical LPP during a later solving run of the same multi-objective hierarchical LPP having changes to supply chain input data 210. After solving for each of the multiple objectives (representing one or more business objectives), the final mathematical solution of the multi-objective hierarchical LPP, when converted to a supply chain, represents an optimized supply chain plan. Initially, a supply chain planning problem may be converted into a multi-objective linear programming problem wherein the mathematical constraints, objectives, and bounds on variables of the supply chain planning problem is mapped to mathematical expressions in the multi-objective linear programming problem. After solving, the mapping of this conversion may be used to translate the solution of the multi-objective LPP to a supply chain plan.

Inventory system 120 comprises server 122 and database 124. Server 122 of inventory system 120 is configured to receive and transmit item data, including item identifiers, pricing data, attribute data, inventory levels, and other like data about one or more items at one or more locations in supply chain network 100. Server 122 stores and retrieves item data from database 124 or one or more locations in supply chain network 100.

Transportation network 130 comprises server 132 and database 134. According to embodiments, transportation network 130 directs one or more transportation vehicles 136 to ship one or more items among one or more stocking locations of one or more supply chain entities 150 based, at least in part, on a supply chain plan or a re-allocation of materials or capacity determined by supply chain planner 110. In addition, the number of items shipped by one or more transportation vehicles 136 in transportation network 130 may also be based, at least in part, on the number of items currently in stock at one or more stocking locations of one or more supply chain entities 150, the number of items currently in transit, a forecasted demand, a supply chain disruption, and the like. One or more transportation vehicles 136 comprise, for example, any number of trucks, cars, vans, boats, airplanes, unmanned aerial vehicles (UAVs), cranes, robotic machinery, or the like. According to embodiments, one or more transportation vehicles 136 may be associated with one or more supply chain entities 150 and may be directed by automated navigation including, for example, GPS guidance, according to particular needs.

One or more imaging devices 140 comprise one or more processors 142, memory 144, one or more sensors 146, and may include any suitable input device, output device, fixed or removable computer-readable storage media, or the like. According to one embodiment, one or more imaging devices 140 comprise one or more electronic devices that may receive imaging information from one or more sensors 146 or from one or more databases in supply chain network 100. One or more imaging devices 140 may identify items near one or more sensors 146 and generate a mapping of the identified one or more items in supply chain network 100. As explained in more detail below, transportation network 130 and/or one or more supply chain entities 150 use the mapping of an item to locate the item in supply chain network 100. The location of the item is then used to coordinate the storage and transportation of items in supply chain network 100 according to one or more plans generated by supply chain planner 110 and/or a reallocation of materials or capacity determined by solver 204. Plans may comprise one or more of a master supply chain plan, production plan, allocation plan, campaign plan, distribution plan, and the like.

One or more imaging devices 140 may comprise a mobile handheld device such as, for example, a smartphone, a tablet computer, a wireless device, or the like. In addition, or as an alternative, one or more imaging devices 140 comprise one or more networked electronic devices configured to transmit item identity information to one or more databases as an item passes by or is scanned by one or more sensors 146. This may include, for example, a stationary scanner located at transportation network 130 or one or more supply chain entities 150 and which identifies items as the items pass near the scanner, including, for example, in one or more transportation vehicles 136. One or more sensors 146 of one or more imaging devices 140 may comprise an imaging sensor, such as, for example, a camera, scanner, electronic eye, photodiode, charged coupled device (CCD), or any sensor that detects images, such as, for example, product images, labels, barcodes, or the like. In addition, or as an alternative, one or more sensors 146 may comprise a radio receiver and/or transmitter configured to read an electronic tag coupled with a product, such as, for example, an RFID tag.

As shown in FIG. 1, supply chain network 100 comprising supply chain planner 110, inventory system 120, transportation network 130, one or more imaging devices 140, and one or more supply chain entities 150 may operate on one or more computers 160 that are integral to or separate from the hardware and/or software that support supply chain planner 110, inventory system 120, transportation network 130, one or more imaging devices 140, and one or more supply chain entities 150. Computer 160 may include any suitable input device 162, such as a keypad, mouse, touch screen, microphone, or other device to input information. Output device 164 may convey information associated with the operation of supply chain network 100, including digital or analog data, visual information, or audio information.

Computer 160 may include fixed or removable computer-readable storage media, including a non-transitory computer-readable medium, magnetic computer disks, flash drives, CD-ROM, in-memory device or other suitable media to receive output from and provide input to supply chain network 100. Computer 160 may include one or more processors 166 and associated memory to execute instructions and manipulate information according to the operation of supply chain network 100 and any of the methods described herein. In addition, or as an alternative, embodiments contemplate executing the instructions on computer 160 that cause computer 160 to perform functions of the method. An apparatus implementing special purpose logic circuitry, for example, one or more field programmable gate arrays (FPGA) or application-specific integrated circuits (ASIC), may perform functions of the methods described herein. Further examples may also include articles of manufacture including tangible computer-readable media that have computer-readable instructions encoded thereon, and the instructions may comprise instructions to perform functions of the methods described herein.

Supply chain planner 110, inventory system 120, transportation network 130, one or more imaging devices 140, and one or more supply chain entities 150 may each operate on one or more separate computers 160, a network of one or more separate or collective computers 160, or may operate on one or more shared computers 160. In addition, supply chain network 100 may comprise a cloud-based computing system having processing and storage devices at one or more locations, local to, or remote from supply chain planner 110, inventory system 120, transportation network 130, one or more imaging devices 140, and one or more supply chain entities 150. In addition, each of the one or more computers 160 may be a work station, personal computer (PC), network computer, notebook computer, tablet, personal digital assistant (PDA), cell phone, telephone, smartphone, mobile device, wireless data port, augmented or virtual reality headset, or any other suitable computing device. In an embodiment, one or more users may be associated with supply chain planner 110, inventory system 120, transportation network 130, one or more imaging devices 140, and one or more supply chain entities 150. These one or more users may include, for example, a "manager" or a "planner" handling supply chain planning and/or one or more related tasks within supply chain network 100. In addition, or as an alternative, these one or more users within supply chain network 100 may include, for example, one or more computers 160 programmed to autonomously handle, among other things, production planning, demand planning, option planning, sales and operations planning, supply chain master planning, plan adjustment after supply chain disruptions, order placement, automated warehouse operations (including removing items from and placing items in inventory), robotic production machinery (including production of items), and/or one or more related tasks within supply chain network 100.

One or more supply chain entities 150 may represent one or more suppliers 152, manufacturers 154, distribution centers 156, and retailers 158 in one or more supply chain networks 100, including one or more enterprises. One or more suppliers 152 may be any suitable entity that offers to sell or otherwise provides one or more items or components to one or more manufacturers 154. One or more suppliers 152 may, for example, receive an item from a first supply chain entity in supply chain network 100 and provide the item to another supply chain entity. Items may comprise, for example, components, materials, products, parts, supplies, or other items, that may be used to produce products. In addition, or as an alternative, an item may comprise a supply or resource that is used to manufacture the item but does not become a part of the item. One or more suppliers 152 may comprise automated distribution systems 153 that automatically transport items to one or more manufacturers based, at least in part, on a supply chain plan, a material or capacity reallocation, current and projected inventory levels, and/or one or more additional factors described herein.

One or more manufacturers 154 may be any suitable entity that manufactures at least one item. One or more manufacturers 154 may use one or more items during the manufacturing process to produce any manufactured, fabricated, assembled, or otherwise processed item, material, component, good, or product. In one embodiment, a product represents an item ready to be supplied to, for example, another one or more supply chain entities 150, such as one or more suppliers 152, an item that needs further processing, or any other item. One or more manufacturers 154 may, for example, produce and sell a product to one or more suppliers 152, another one or more manufacturers 154, distribution center 156, retailers 158, a customer, or any other suitable entity. One or more manufacturers 154 may comprise automated robotic production machinery 155 that produce products based, at least in part, on a supply chain plan, a material or capacity reallocation, current and projected inventory levels, and/or one or more additional factors described herein.

One or more distribution centers 156 may be any suitable entity that offers to sell or otherwise distributes at least one product to one or more retailers 158 and/or customers. One or more distribution centers 156 may, for example, receive a product from a first supply chain entity in supply chain network 100 and store and transport the product for a second supply chain entity. One or more distribution centers 156 may comprise automated warehousing systems 157 that automatically transport products to one or more retailers 158 or customers and/or automatically remove an item from, or place an item into, inventory based, at least in part, on a supply chain plan, a material or capacity reallocation, current and projected inventory levels, and/or one or more additional factors described herein.

One or more retailers 158 may be any suitable entity that obtains one or more products to sell to one or more customers. In addition, one or more retailers 158 may sell, store, and supply one or more components and/or repair a product with one or more components. One or more retailers 158 may comprise any online or brick and mortar location, including locations with shelving systems 159. Shelving systems 159 may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of one or more retailers 158 based on computer-generated instructions or automatically by machinery to place products in a desired location.

Although one or more suppliers 152, manufacturers 154, distribution centers 156, and retailers 158 are shown and described as separate and distinct entities, the same entity may simultaneously act as any other one or more suppliers 152, manufacturers 154, distribution centers 156, and retailers 158. For example, one or more manufacturers 154 acting as a manufacturer could produce a product, and the same entity could act as one or more suppliers 156 to supply a product to another one or more supply chain entities 150. Although one example of supply chain network 100 is shown and described, embodiments contemplate any configuration of supply chain network 100, without departing from the scope of the present disclosure.

In one embodiment, supply chain planner 110 may be coupled with network 170 using communication link 180, which may be any wireline, wireless, or other link suitable to support data communications between supply chain planner 110 and network 170 during operation of supply chain network 100. Inventory system 120 may be coupled with network 170 using communication link 182, which may be any wireline, wireless, or other link suitable to support data communications between inventory system 120 and network 170 during operation of supply chain network 100. Transportation network 130 may be coupled with network 170 using communication link 184, which may be any wireline, wireless, or other link suitable to support data communications between transportation network 130 and network 170 during operation of supply chain network 100. One or more imaging devices 140 are coupled with network 170 using communication link 186, which may be any wireline, wireless, or other link suitable to support data communications between one or more imaging devices 140 and network 170 during operation of distributed supply chain network 100. One or more supply chain entities 150 may be coupled with network 170 using communication link 188, which may be any wireline, wireless, or other link suitable to support data communications between one or more supply chain entities 150 and network 170 during operation of supply chain network 100. Computer 160 may be coupled with network 170 using communication link 190, which may be any wireline, wireless, or other link suitable to support data communications between computer 160 and network 170 during operation of supply chain network 100.

Although the communication links 180-190 are shown as generally coupling supply chain planner 110, inventory system 120, transportation network 130, one or more imaging devices 140, one or more supply chain entities 150, and computer 160 to network 170, each of supply chain planner 110, inventory system 120, transportation network 130, one or more imaging devices 140, one or more supply chain entities 150, and computer 160 may communicate directly with each other, according to particular needs.

In another embodiment, network 170 includes the Internet and any appropriate local area networks (LANs), metropolitan area networks (MANs), or wide area networks (WANs) coupling supply chain planner 110, inventory system 120, transportation network 130, one or more imaging devices 140, one or more supply chain entities 150, and computer 160. For example, data may be maintained by locally or externally of supply chain planner 110, inventory system 120, transportation network 130, one or more imaging devices 140, one or more supply chain entities 150, and computer 160 and made available to one or more associated users of supply chain planner 110, inventory system 120, transportation network 130, one or more imaging devices 140, one or more supply chain entities 150, and computer 160 using network 170 or in any other appropriate manner. For example, data may be maintained in a cloud database at one or more locations external to supply chain planner 110, inventory system 120, transportation network 130, one or more imaging devices 140, one or more supply chain entities 150, and computer 160 and made available to one or more associated users of supply chain planner 110, inventory system 120, transportation network 130, one or more imaging devices 140, one or more supply chain entities 150, and computer 160 using the cloud or in any other appropriate manner. Those skilled in the art will recognize that the complete structure and operation of network 170 and other components within supply chain network 100 are not depicted or described. Embodiments may be employed in conjunction with known communications networks and other components.

In accordance with the principles of embodiments described herein, supply chain planner 110 may reallocate inventory of one or more items among demands or orders of one or more supply chain entities 150. In addition, the one or more computers 160 associated with supply chain network 100 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 150, and the configuration and quantity of packaging and shipping of items based on current inventory, production levels, and/or one or more other factors described herein. For example, the methods described herein may include computers 160 receiving product data from automated machinery having at least one sensor and product data 214 corresponding to an item detected by the automated machinery. Received product data 214 may include an image of the item, an identifier, as described above, and/or other data associated with the item, including, for example, dimensions, texture, estimated weight, and the like.

According to embodiments, the methods may further include computers 160 looking up received product data 214 in a database system associated with supply chain planner 110 to identify the item corresponding to product data 214 received from automated machinery. Based on the identification of the item, computers 160 may also identify (or alternatively generate) a first mapping in the database system, where the first mapping is associated with the current location of the identified item. Computers 160 may also identify a second mapping in the database system, where the second mapping is associated with a past location of the identified item. Computers 160 may also compare the first mapping and the second mapping to determine if the current location of the identified item in the first mapping is different than the past location of the identified item in the second mapping. Computers 160 may then send instructions to the automated machinery based, as least in part, on one or more differences between the first mapping and the second mapping such as, for example, to locate items to add to or remove from an inventory of or shipment for one or more supply chain entities 150. In addition, or as an alternative, supply chain planner 110 monitors one or more supply chain constraints of one or more items at one or more supply chain entities 150 and adjusts the orders and/or inventory of one or more supply chain entities 150 at least partially based on one or more supply chain constraints.

Figure 2:
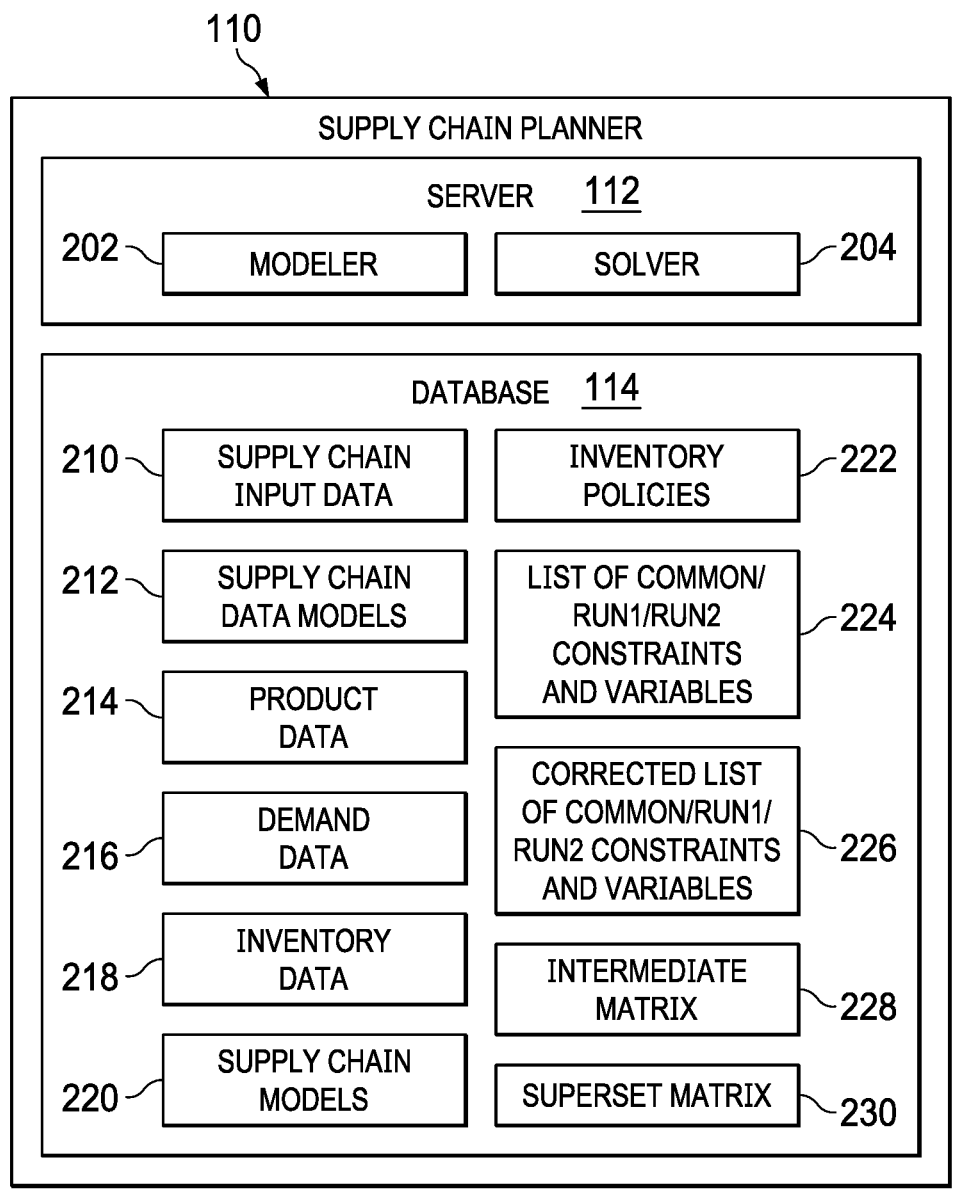
FIG. 2 illustrates the supply chain planner of FIG. 1 in greater detail, in accordance with an embodiment.

FIG. 2 illustrates supply chain planner 110 of FIG. 1 in greater detail, in accordance with an embodiment. As discussed above, supply chain planner 110 comprises server 112 and database 114. Although supply chain planner 110 is shown as comprising a single server 112 and a single database 114, embodiments contemplate any suitable number of servers or databases internal to or externally coupled with supply chain planner 110.

Server 112 of supply chain planner 110 may comprise modeler 202 and solver 204. Although server 112 is shown and described as comprising a single modeler 202 and a single solver 204, embodiments contemplate any suitable number or combination of these located at one or more locations, local to, or remote from supply chain planner 110, such as on multiple servers or computers at any location in supply chain network 100.

According to embodiments, modeler 202 of server 112 identifies resources, operations, buffers, and pathways, and maps supply chain network 100 using data models 212, as described in more detail below. In one embodiment, modeler 202 maps optional resources and material as primary and alternate pathways. In addition, or in the alternative, modeler 202 generates a supply chain planning problem to represent the flow of materials through supply chain network 100.

According to embodiments, solver 204 of supply chain planner 110 solves a supply chain planning problem as an LPP comprising three components: objectives, constraints, and bounds. According to embodiments, objectives of a multi-objective LPP represent business objectives (such as, for example, minimizing total inventory, maximizing profits, etc.), constraints comprise limitations to capacity, materials, lead times, and the like, and bounds comprise maximum and/or minimum values for decision variables (such as, for example, capacity can only be used for ten hours per day, then ten hours may be the upper bound on the capacity usage).

Database 114 of supply chain planner 110 may comprise one or more databases or other data storage arrangement at one or more locations, local to, or remote from, server 112. Database 114 comprises, for example, supply chain input data 210, data models 212, product data 214, demand data 216, inventory data 218, supply chain models 220, inventory policies 222, lists of common/Run1/Run2 constraints and variables 224, corrected lists of common/Run1/Run2 constraints and variables 226, intermediate matrix 228, and superset matrix 230. Although database 114 is shown and described as comprising supply chain data 210, data models 212, product data 214, demand data 216, inventory data 218, supply chain models 220, inventory policies 222, lists of common/Run1/Run2 constraints and variables 224, corrected lists of common/Run1/Run2 constraints and variables 226, intermediate matrix 228, and superset matrix 230, embodiments contemplate any suitable number or combination of these, located at one or more locations, local to, or remote from, supply chain planner 110 according to particular needs.

As an example only and not by way of limitation, database 114 stores supply chain input data 210, including one or more supply chain planning problems of supply chain network 100 that may be used by supply chain planner 110 and/or solver 204. Supply chain input data 210 may comprise for example, various decision variables, business constraints, goals, and objectives of one or more supply chain entities 150. According to some embodiments, supply chain input data 210 may comprise hierarchical objectives specified by, for example, business rules, master planning requirements, scheduling constraints, and discrete constraints, including, for example, sequence dependent setup times, lot-sizing, storage, shelf life, and the like.

Data models 212 represent the flow of materials through one or more supply chain entities 150 of supply chain network 100. Modeler 202 of supply chain planner 110 may model the flow of materials through one or more supply chain entities 150 of supply chain network 100 as one or more data models 212 comprising, for example, a network of nodes and edges. Material storage and/or transition units may be modeled as nodes, which may be referred to as buffer nodes, buffers, or nodes. Each node may represent a buffer for an item (such as, for example, a raw material, intermediate good, finished good, component, and the like), resource, or operation (including, for example, a production operation, assembly operation, transportation operation, and the like). Various transportation or manufacturing processes are modeled as edges connecting the nodes. Each edge may represent the flow, transportation, or assembly of materials (such as items or resources) between the nodes by, for example, production processing or transportation. A planning horizon for the data models 212 may be broken down into elementary time-units, such as, for example, time-buckets, or, simply, buckets. The edge between two buffer nodes denotes processing of material and the edge between different buckets for the same buffer indicates inventory carried forward. Flow-balance constraints for most, if not every buffer in every bucket, model the material movement in supply chain network 100.

Product data 214 of database 114 may comprise one or more data structures for identifying, classifying, and storing data associated with products, including, for example, a product identifier (such as a Stock Keeping Unit (SKU), Universal Product Code (UPC), or the like), product attributes and attribute values, sourcing information, and the like. Product data 214 may comprise data about one or more products organized and sortable by, for example, product attributes, attribute values, product identification, sales quantity, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, fill level, color, and the like).

Demand data 216 of database 114 may comprise, for example, any data relating to past sales, past demand, purchase data, promotions, events, or the like of one or more supply chain entities 150. Demand data 216 may cover a time interval such as, for example, by the minute, hour, daily, weekly, monthly, quarterly, yearly, or any suitable time interval, including substantially in real time. According to embodiments, demand data 216 may include historical demand and sales data or projected demand forecasts for one or more retail locations, customers, regions, or the like of one or more supply chain entities 150 and may include historical or forecast demand and sales segmented according to product attributes, customers, regions, or the like.

Inventory data 218 of database 114 may comprise any data relating to current or projected inventory quantities or states, order rules, or the like. For example, inventory data 218 may comprise the current level of inventory for each item at one or more stocking locations across supply chain network 100. In addition, inventory data 218 may comprise order rules that describe one or more rules or limits on setting an inventory policy, including, but not limited to, a minimum order quantity, a maximum order quantity, a discount, a step-size order quantity, and batch quantity rules. According to some embodiments, supply chain planner 110 accesses and stores inventory data 218 in database 114, which may be used by supply chain planner 110 to place orders, set inventory levels at one or more stocking points, initiate manufacturing of one or more items (or components of one or more items), or the like. In addition, or as an alternative, inventory data 218 may be updated by receiving current item quantities, mappings, or locations from inventory system 120, transportation network 130, one or more imaging devices 140, and/or one or more supply chain entities 150.

Supply chain models 220 of database 114 may comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). Additionally, or in the alternative, supply chain models 220 may comprise characteristics that specify the supply chain structure in even more detail, including, for example, specifying the type of collaboration with the customer (e.g. Vendor-Managed Inventory (VMI)), from which stocking locations or suppliers items may be sourced, customer priorities, demand priorities, how products may be allocated, shipped, or paid for, by particular customers, and the destination stocking locations or one or more supply chain entities 150 where items may be transported. Each of these characteristics may lead to different supply chain models 220.

Inventory policies 222 of database 114 may comprise any suitable inventory policy describing the reorder point and target quantity, or other inventory policy parameters that set rules for supply chain planner 110 to manage and reorder inventory. Inventory policies 222 may be based on target service level, demand, cost, fill rate, or the like. According to embodiment, inventory policies 222 comprise target service levels that ensure that a service level of one or more supply chain entities 150 is met with a certain probability. For example, one or more supply chain entities 150 may set a target service level at 95%, meaning one or more supply chain entities 150 will set the desired inventory stock level at a level that meets demand 95% of the time. Although, a particular target service level and percentage is described; embodiments contemplate any target service level, for example, a target service level of approximately 99% through 90%, 75%, or any target service level, according to particular needs. Other types of service levels associated with inventory quantity or order quantity may comprise, but are not limited to, a maximum expected backlog and a fulfillment level. Once the service level is set, supply chain planner 110 may determine a replenishment order according to one or more replenishment rules, which, among other things, indicates to one or more supply chain entities 150 to determine or receive inventory to replace the depleted inventory.

According to embodiments, solver 204 generates lists of common/Run1/Run2 constraints and variables 224 and corrected lists of common/Run1/Run2 constraints and variables 226 to calculate intermediate matrix 228 and superset matrix 230. As described in further detail below, solver 204 categorizes constraints and variables according to whether they are used in only a first run of solving the LPP problem, used in only a second run of solving the LPP problem, or they are common to both the first and second runs of the LPP problem. In addition, when the coefficient of the constraints and/or variables change between the two runs of the LPP problem, solver 204 further adds to and/or removes from constraints and variables lists of common/Run1/Run2 constraints and variables 224 to generate corrected lists of common/Run1/Run2 constraints and variables 226.

In one embodiment, solver 204 calculates intermediate matrix 228 and superset matrix 230 using lists of common/Run1/Run2 constraints and variables 224 and/or the corrected lists of common/Run1/Run2 constraints and variables 226, as described in further detail below. In addition, or as an alternative, solver 204 categorizes each change between the first run and the second run according to whether the change affects the primal feasibility or the dual feasibility. Solver 204 may then calculate intermediate matrix 228 and superset matrix 230 using the categorized feasibility changes, as described in further detail below. These matrices 228-230 form a bridge that links the optimal basis of the final solution of the first run of the LPP to the starting basis of a second run of the LPP, which provides for more quickly generating the solution for the second run, which is then used to generate the supply chain plan represented by data models 212.

Figure 3:
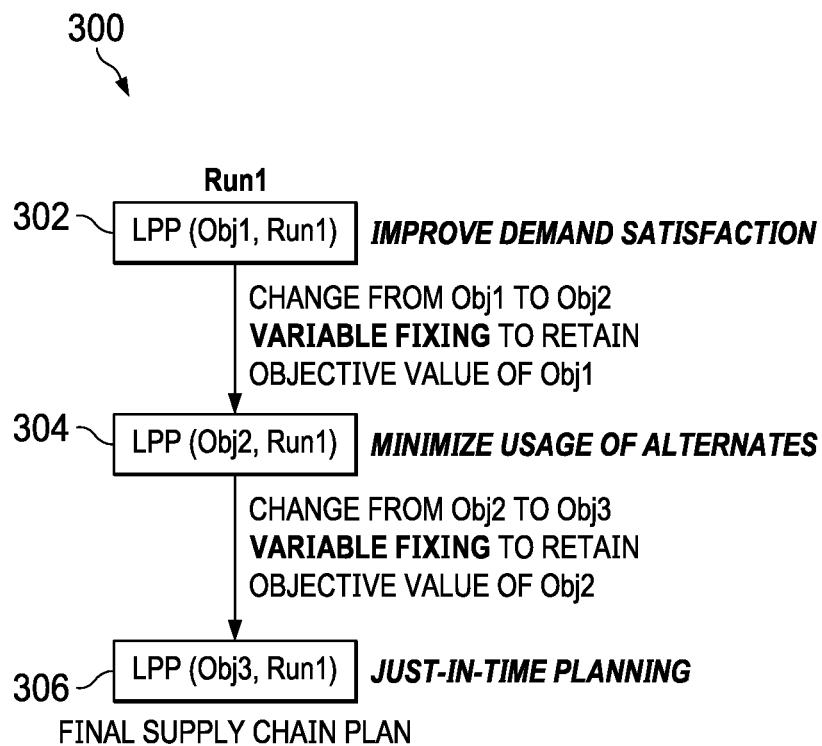
FIG. 3 illustrates a base run of a multi-objective hierarchical LPP, in accordance with an embodiment.

FIG. 3 illustrates base run 300 of a multi-objective hierarchical LPP, in accordance with an embodiment. Base run (Run1) 300 comprises solutions 302-306 of the multi-objective hierarchical LPP for each of three objectives: base run solution of LPP for first objective (Obj1) 302; base run solution of LPP for second objective (Obj2) 304; and base run solution of LPP for third objective (Obj3) 306. In this example, Obj1 comprises improve demand satisfaction, which may be represented by an objective function that minimizes the quantity of unmet demand. Obj2 comprises maximizing usage of primary resources, which may be represented by an objective function that minimizes usage of alternate resources. By way of a further example, Obj3 comprises planning items as just-in-time (JIT) as possible, which may be represented by an objective function that minimizes the quantity of carried-over items. Although exemplary objectives and objective functions are shown and described, embodiments contemplate any objective represented by minimizing or maximizing any suitable objective function, according to particular needs.

As described in more detail herein, embodiments of solver 204 of supply chain planner 110 may solve a multi-objective hierarchical LPP by iteratively loading and solving the LPP for each objective in accordance with an order described by a hierarchy of the objectives. A hierarchy of the objectives indicates that the hierarchical objectives are solved in the order indicated by the hierarchy, from an objective higher in the hierarchy (higher order or higher priority objective) to an objective lower in the hierarchy (lower order or lower priority objective). The hierarchical order of the objectives may indicate the order of importance of the objectives (i.e. the first objective is more important than the second objective; the second objective is more important than the third objective etc.). When solving the LPP for one or more lower objectives, solver 204 sets decision variables at their upper or lower bounds (which may be referred to as variable fixing) to retain the objective value of one or more higher objectives. In addition, or in the alternative, solver 204 may use, as a starting basis, the optimal basis of the solution of the LPP for the preceding higher objective when solving for a lower objective. After solving the LPP for a current objective, solver 204 updates the list of the variable to be fixed at their upper or lower bounds based on the solution to the current objective. Solver 204 may then iteratively repeat solving the LPP for each objective following this technique until solver 204 solves all objectives of the multi-objective hierarchical LPP, as described below.

According to embodiments, solver 204 uses a primal simplex method and/or a dual simplex method to solve each objective of an LPP by going from one basis to the next, iteratively, until reaching an optimal basis that is linked to a unique optimal solution of the LPP for the current objective. The optimal basis is both primal-feasible and dual-feasible. Primal-infeasible and dual-infeasible refer to the performance of a particular starting basis when solving an LPP with a primal simplex method or a dual simplex method, as described below. When using a primal simplex method, solver 204 searches for a primal feasible basis (which may be dual infeasible) and then transforms the found primal feasible basis to another primal feasible basis, iteratively, until solver 204 identifies a primal feasible basis that is also the optimal basis. When using a dual simplex method, solver 204 searches for a dual feasible basis (which may be primal infeasible), and then transforms the found dual feasible basis to another dual feasible basis, iteratively, until solver 204 identifies a dual feasible basis that is also the optimal basis. Solver 204 uses a primal simplex method and a dual simplex method to solve an LPP by going from one basis to the next, iteratively, until reaching an optimal basis that is linked to a unique optimal solution of an LPP, which is both primal-feasible and dual-feasible.

Figure 4:
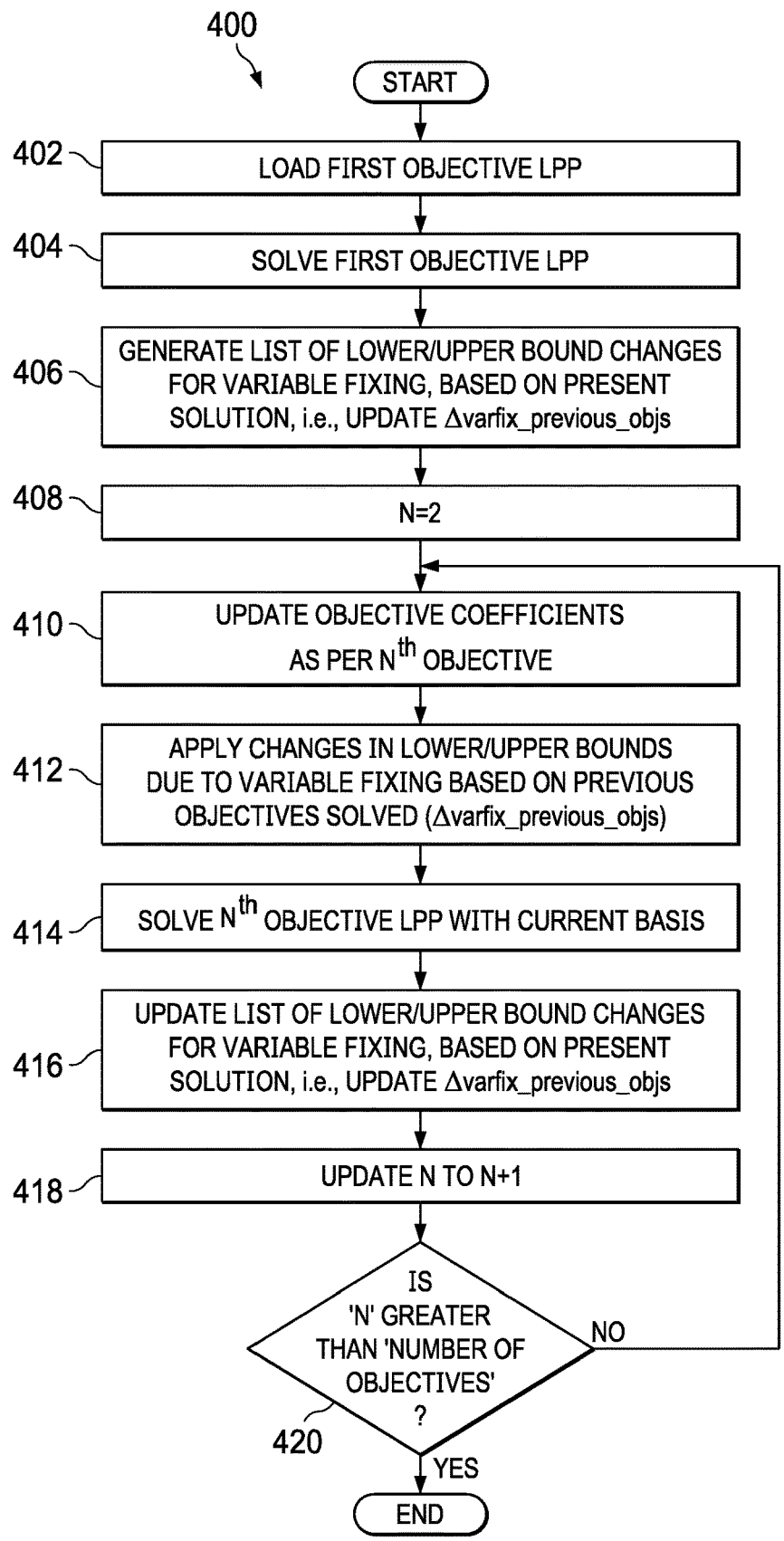
FIG. 4 illustrates an exemplary method to solve a multi-objective hierarchical LPP, in accordance with an embodiment.

FIG. 4 illustrates method 400 to solve a multi-objective hierarchical LPP, in accordance with an embodiment. Method 400 proceeds by one or more activities, which although described in a particular order may be performed in one or more permutations, according to particular needs.

Method 400 begins at activity 402, where supply chain planner 110 loads into memory a supply chain planning problem comprising an LPP and the first objective of the multiple objectives. As stated above, a hierarchical multi-objective LPP comprises two or more hierarchical objective functions that represent two or more hierarchical business objectives, one or more mathematical constraints that represent one or more supply chain constraints (such as, for example, material, capacity, lead time constraints, etc.), one or more decision variables that represent supply chain inputs. By way of further explanation and not of limitation, a non-limiting example of method 400 is given in connection with Run1 300 of FIG. 3. As stated above Run1 300 comprises solutions 302-306 of the LPP for each of three objectives (Obj1, Obj2, and Obj3): base run solution of LPP for Obj1 302; base run solution of LPP for Obj2 304; and base run solution of LPP for Obj3 306. Describing method 400 in connection with this example, at this activity, supply chain planner 110 loads the LPP with Obj1, comprising demand satisfaction, into memory of supply chain planner 110.

At activity 404, solver 204 of supply chain planner 110 solves the LPP for the first objective. Solver 204 solves the LPP for the first objective using, for example, the primal simplex method or the dual simplex method. Although solver 204 is described as a particular solver using the primal simplex method or the dual simplex method, embodiments contemplate any suitable LPP solver using one or more solving methods, such as, for example, a primal simplex method, a dual simplex method, a barrier method, and the like.

At activity 406, solver 204 generates lower and upper bound changes for variable fixing, based on the solution of the first LPP. To ensure that the first objective will not be degraded by solving the next objective, solver 204 may fix one or more variables to an upper bound or a lower bound. Continuing with the example of FIG. 3, variable fixing ensures that base run solution of LPP for Obj1 302 is not degraded when solving the LPP for Obj2 and generating base run solution of LPP for Obj2 304.

During variable fixing, solver 204 fixes particular variables to their upper or lower bounds according to a list that is updated after each objective solve. Generally, variables which can deteriorate an objective value are fixed at their lower bounds, variables which can improve an objective value are fixed at their upper bounds, and variables which are neutral remain unfixed. Upon solving the LPP, of solver 204 generates, as part of the solution data, a reduced cost of each variable. In the case of a minimization objective, when a variable has a positive reduced cost, then it will deteriorate the objective and hence be fixed to its lower bound, while a variable with a negative reduced cost will improve the objective value and hence be fixed to its upper bound. By way of further explanation, simplified examples of variable fixing are given in connection with an LPP having the exemplary first, second, and third objectives (Obj1, Obj2, and Obj3), described above. In this example, a first variable 'met quantity of a Customer1 demand' has a negative reduced cost for the objective function of Obj1 (minimizing the quantity of unmet demand) because increasing the value of the variable improves the objective. A second variable 'met quantity of a Customer2 demand' has a neutral reduced cost for the objective function of Obj1 (minimizing the quantity of unmet demand) because changing the value of the variable has no effect on the objective. Accordingly, after solving the LPP for the first objective and prior to solving for the second objective, solver 204 fixes the first variable to its upper bound, while the second variable remains unbounded.

Continuing with this example, third variable 'capacity utilization of an alternate resource' has a positive reduced cost for the objective function of Obj2 (minimizing usage of alternate resources) because increasing the value of the variable deteriorates the objective. After solving the LPP for the second objective and prior to solving for the third objective, solver 204 fixes the third variable to its lower bound. The above-described exemplary variables and objectives are simplified examples where the effect of the variable on the objective value is direct, and the deteriorating, improving, or neutral effect of the variable on the objective value is apparent. However, most variables of an LPP indirectly affect the objective value, and the deteriorating, improving, or neutral effect of the variable on the objective value is not apparent. By way of example only and not of limitation, a resource-related variable would indirectly affect a demand satisfaction objective. By checking if the reduced cost is positive, negative, or neutral, supply chain planner 110 determines whether the effect is deteriorating, improving, or neutral. In the case of a maximization objective, a positive reduced cost improves while a negative reduced cost deteriorates; hence a variable with a positive reduced cost is fixed at its upper bound and a variable with a negative reduced cost is fixed at its lower bound. In both cases, no fixing is done for a variable with a zero (or negligible) reduced cost.

According to an embodiment, supply chain planner 110 selects a variable fixing tolerance value to set a range of a reduced costs that solver 204 determines to be negligible. In one embodiment, the range of reduced cost that solver 204 determines to be negligible extends from a negative value of the variable fixing tolerance value to a positive value of the variable fixing tolerance value. By way of example only and not of limitation, when supply chain planner 110 sets a variable fixing tolerance value to 0.0001, solver 204 determines a reduced cost between −0.0001 and 0.0001 is negligible, a reduced cost greater than 0.0001 is positive, and a reduced cost less than −0.0001 is negative. Although the variable fixing tolerance value is described as defining a range extending from −0.0001 to 0.0001, embodiments contemplate any suitable range of values for setting a negligible reduced cost having any suitable positive value and any suitable negative value, according to particular needs.

At activity 408, a counter is set at N=2. According to embodiments, the counter represents the current iteration of solves of the multi-objective hierarchical LPP. After supply chain planner 110 loads and solves the LPP and generates a list of lower and upper bound changes for the first objective, the counter is set at N=2 and the supply chain planner continues to activity 410, where solver 204 updates the objective coefficients according to the Nth objective.

Continuing with the previous example where the counter has increased to N=2, the Nth objective comprises a mathematical representation of the second objective in the hierarchy of objectives, Obj2, which comprises maximizing usage of primary resources, as discussed above. As the counter is increased further during a further iteration, as described below, the Nth objective represents the next objective in the order of the hierarchy (e.g. N=3, solver 204 updates the objective coefficients according to Obj3, the $3^{rd}$ objective, which comprises planning items as just-in-time (JIT) as possible. According to embodiments, as the counter is increased further, as described below, the Nth objective represents the next objective in the order of the hierarchy N=4, solver 204 updates the objective coefficients according to the 4' objective, etc.).

At activity 412, solver 204 applies the changes to the lower and upper bounds according to variable fixing based on the previous objectives solved. At this activity, after changing the objective of the LPP, solver 204 fixes variables at their lower or upper bounds according to the list of variable fixes to prevent degradation of the solution in regard to the first objective. As stated above, variables which can deteriorate an objective value are fixed at their lower bounds, variables which can improve an objective value are fixed at their upper bounds, and variables which are neutral remain unfixed.

At activity 414, solver 204 solves the LPP with the Nth objective. Continuing with the previous example where the counter has increased to N=2, supply chain planner 110 solves the second objective LPP with solver 204 using, for example, the primal simplex method or the dual simplex method. Although solver 204 is described as a particular solver using the primal simplex method or the dual simplex method, embodiments contemplate any suitable LPP solver using one or more solving methods, such as, for example, a primal simplex method, a dual simplex method, a barrier method, and the like. As described in more detail below, when solving an LPP with a lower objective with variable fixing using the primal simplex method or the dual simplex method, solver 204 may use, as a starting basis, the optimal basis of the preceding higher objective's LPP.

At activity 416, solver 204 updates the list of lower and upper bounds changes for variable fixing based on the present solution. As described above, solver 204 generates a list of lower and upper bounds for variable fixing to ensure solving an objective does not degrade the solution of an earlier objective. Continuing with the previous example, after solving the second objective, solver 204 updates the list of lower and upper bounds for variable fixing to prevent degradation of the second objective when solving a third objective (e.g. base run solution of LPP for Obj2 304 is not degraded when generating base run solution of LPP for Obj3 306).

At activity 418, the counter is updated to N+1 and solver 204 continues to activity 420, where solver 204 determines whether the counter N is greater than the number of objectives. When the counter is greater than the number of objectives, the method ends. When the counter is not greater than the number of objectives, the method returns to activity 410, where solver 204 updates the objective coefficients according to the Nth objective and continues to iteratively solve the multi-objective hierarchical LPP for each objective by performing activities 410-420, until solver 204 determines at activity 420 that N is greater than the number of objectives, and the method ends.

Solver 204 continues to iteratively solve each objective of the LPP according to the hierarchy and fixing the lower and upper bounds to maintain the optimization of the solution until the counter N is greater than the number of objectives, as stated above. After solving each of the hierarchical objectives, solver 204 generates a solution of the multi-objective hierarchical LPP that has been optimized for each business objective represented by mathematical hierarchical objectives. The final mathematical solution when converted to a supply chain is a supply chain plan, which is optimized for all of the hierarchical objectives. The supply chain plan may represent a master production plan comprising the allocation of materials and capacity of one or more supply chain entities 150 in a supply chain network at each time bucket to produce an item in accordance with the multiple business objectives and constrained according to the supply chain input data 210. According to embodiments, the supply chain plan may change from day-to-day as the supply chain input data 210 changes.

Figure 5:
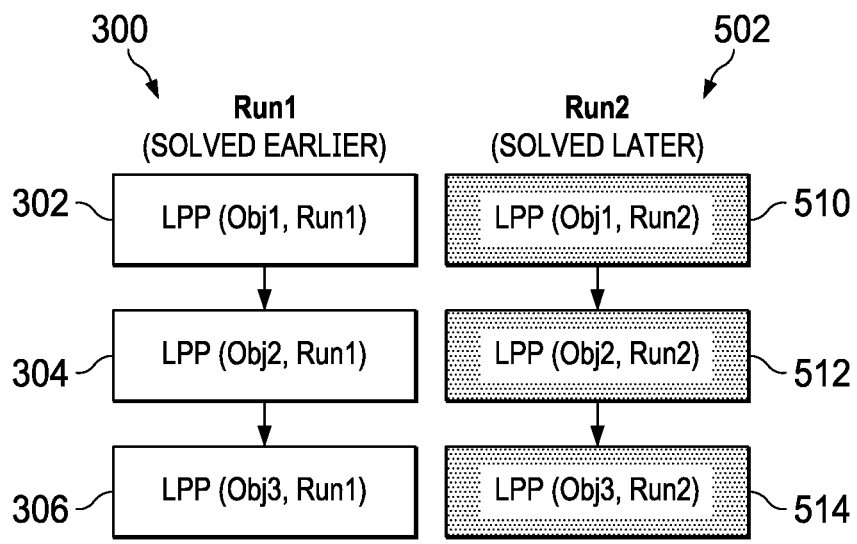
FIG. 5 illustrates two solving runs of a multi-objective hierarchical LPP, in accordance with an embodiment.

FIG. 5 illustrates two solving runs of a multi-objective hierarchical LPP, in accordance with an embodiment. According to the illustrated embodiment, a first solve of a multi-objective hierarchical LPP comprises base run 300 of FIG. 3 (Run1), which is independent of a second solve of the multi-objective hierarchical LPP (Run2) 502. As stated above Run1 300 comprises solutions 302-306 of the results of a solve to each of three objectives (Obj1, Obj2, and Obj3) of the hierarchical multi-objective LPP: solution of LPP for Obj1 302; solution of LPP for Obj2 304; and solution of LPP for Obj3 306. Run2 502 comprises a solve of the same multi-objective hierarchical LPP as base run 300 but may comprise changes to the supply chain. For example, Run2 comprises solutions 510-514, comprising the results of a solve to each of three objectives (Obj1, Obj2, and Obj3) of the hierarchical multi-objective LPP: solution of LPP for Obj1 510; solution of LPP for Obj2 512; and solution of LPP for Obj3 514. Continuing with the previously described example, Obj1 comprises improve demand satisfaction, Obj2 comprises maximizing usage of primary resources, and Obj3 comprises planning items as just-in-time (JIT) as possible. Although exemplary objectives are shown and described, embodiments contemplate any objective represented by minimizing or maximizing any suitable objective function, according to particular needs.

According to embodiments, solver 204 uses the optimal basis of Run1 300 to more efficiently solve Run2 502. However, when solver 204 uses the optimal basis of Run1 300 to solve Run 2 502, changes to supply chain input data 210 may render the LPP of Run2 502 primal-infeasible and/or dual-infeasible. Primal-infeasible and dual-infeasible refer to the performance of a particular starting basis when solving an LPP with a primal simplex method or a dual simplex method. Solver 204 uses a primal simplex method and a dual simplex method to solve an LPP by going from one basis to the next, iteratively, until reaching an optimal basis that is linked to a unique optimal solution of an LPP, which is both primal-feasible and dual-feasible. According to embodiments, solver 204 uses a primal simplex method to search for a primal feasible basis (which may be dual infeasible), and then transforms the primal feasible basis to another primal feasible basis, and continues to transform a previous primal feasible basis to a subsequent primal feasible basis until solver 204 identifies a primal feasible basis that is also the optimal basis. In addition, or in the alternative, solver 204 uses a dual simplex method to search for a dual feasible basis (which may be primal infeasible), and then solver 204 transforms the dual feasible basis to another dual feasible basis until solver 204 identifies a dual feasible basis that is also the optimal basis. Some changes to a supply chain may retain the primal feasibility or the dual feasibility of the optimal basis. Changes to the supply chain that retain primal feasibility may be referred to as $\Delta DF$, i.e. the changes to the supply chain that make an optimal basis of a previous run (e.g. Run1 300) dual infeasible in a current run (e.g. Run2 502). Changes to supply chain that retain dual feasibility may be referred to as $\Delta PF$, i.e. the changes to the supply chain that make an optimal basis of a previous run (e.g. Run1 300) primal infeasible in a current run (e.g. Run2 502).

In addition and as described in more detail below, when solver 204 uses a primal feasible basis as a starting basis for the primal simplex method, solver 204 receives a performance advantage in the operation of a computer system which reduces the time needed to generate a supply chain production plan. Similarly, when solver 204 uses a dual feasible basis as a starting basis for the dual simplex method, solver 204 receives a performance advantage in the operation of a computer system which reduces the time needed to generate a supply chain production plan.

As described in more detail below, a disclosed system reduces run times of subsequent solves of multi-objective hierarchical LPP, without reducing plan quality. According to some embodiments, supply chain planner 110 provides for using a solution from a previous day to solve the supply chain planning problem on the current day, running multiple solves during the same day based on input data changes, running scenarios efficiently using solution information of a base run, using a solution before lot-sizing to increase the speed of solving after lot-sizing, and increasing the speed of campaign planning. With unit supply chain changes between a base run and a new run, embodiments of the disclosed system using method 900 (FIG. 9) took less than 6% of the runtime of method 400. In addition, according to some embodiments, using method 1100 took less than 20% of the runtime of method 400. With a large number of supply chain changes between a base run and a new run, embodiments of method 1100 took 4% to 60% of the computational runtime of method 400.

FIG. 6 illustrates chart 600 of changes to a supply chain and to a supply chain planning problem and the resultant effect on retaining primal or dual feasibility, in accordance with an embodiment. Chart 600 is ordered according to serial number 602 of each functional change 604 and corresponding LPP change 606, which are classified according to their effect on primal feasibility 608 and their effect on dual feasibility 608. As described below, each functional change 604 and corresponding LPP change 606 are classified as a primal feasibility change ($\Delta PF$), a dual feasibility change ($\Delta DF$), both, or neither.

For example, when solver 204 receives supply chain input data 210 indicating that a functional change to the supply chain comprises a new demand, solver 204 generates the corresponding functional change to the optimal basis of a previous solving run. The changes to the optimal basis to add a new demand retain the primal feasibility of an optimal basis but alter the dual feasibility of the optimal basis. By way of a further example, a change to a demand need quantity retains the dual feasibility of the optimal basis but not the primal feasibility of the optimal basis. In addition, it should be noted that changes to a demand need date retains neither the primal nor the dual feasibility of the optimal basis. However, changes to a need date of an existing demand may be subdivided into three changes, which may be applied one-at-a-time, and for which the primal or the dual feasibility is retained for each of the sub-divided three changes. According to an embodiment, solver 204 may apply changes to the need date of an existing demand as: inclusion of a new variable and change in objective coefficient of a variable, which are $\Delta DF$ and change in need quantity of an existing demand, which is $\Delta PF$.

When the supply chain changes from one run to the next run are divided into $\Delta DF$ and $\Delta PF$, then solver 204 may first apply $\Delta DF$ to a first run's LPP such that the optimal basis of the first run LPP is a primal feasible starting basis and, after solving this efficiently by the primal simplex method, solver 204 may apply $\Delta PF$ to the resulting optimal basis of the primal simplex solve of the $\Delta DF$ LPP such that it retains dual feasibility and is efficiently solved by the dual simplex method.

Although solver 204 is described as adding $\Delta DF$ supply chain changes and solving using a primal simplex method followed by adding $\Delta PF$ changes and solving using a dual simplex method, embodiments contemplate adding $\Delta PF$ changes and solving using a dual simplex method followed by adding $\Delta DF$ supply chain changes and solving using a primal simplex method, according to particular needs.

Figure 7:
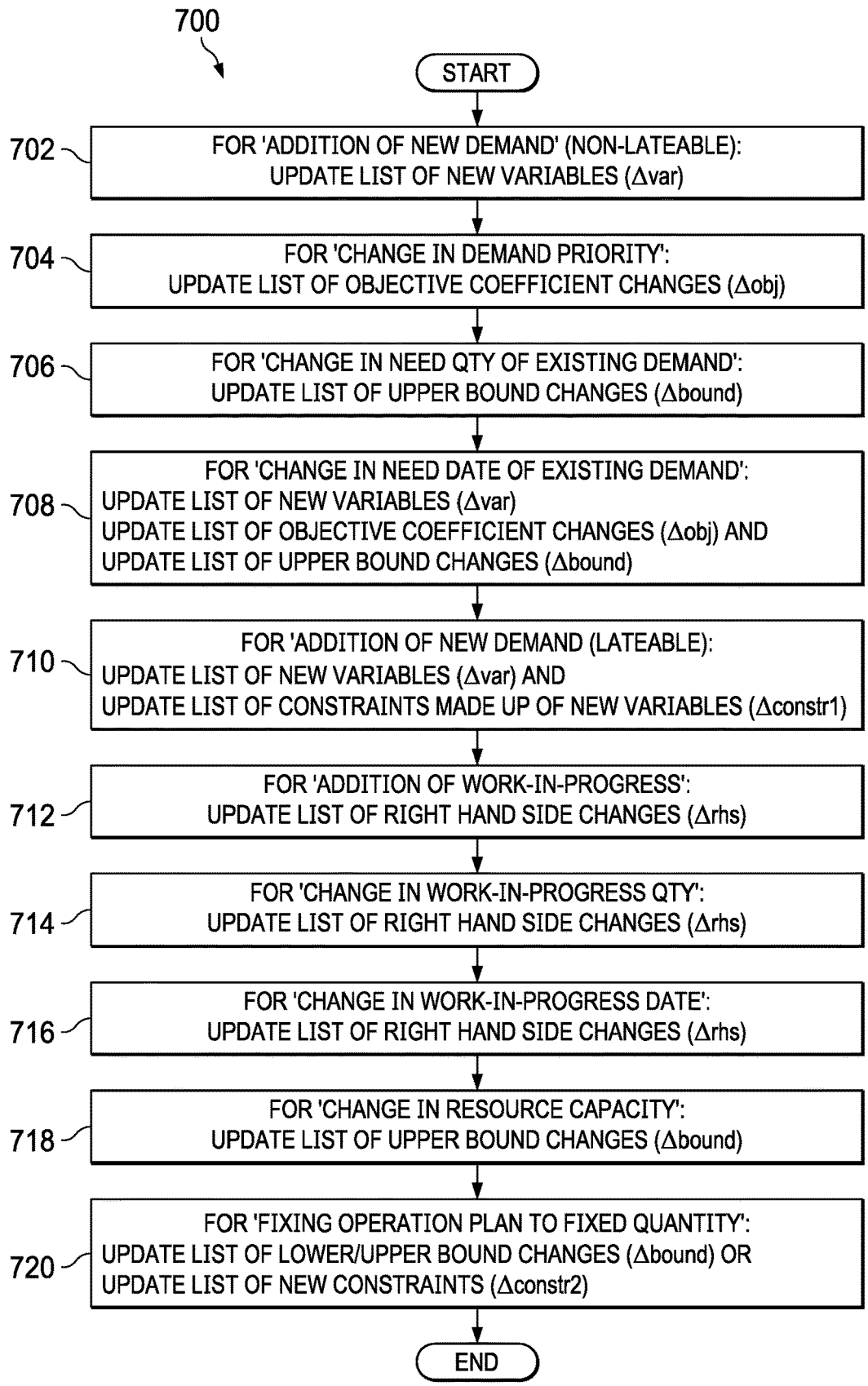
FIG. 7 illustrates a method of applying functional changes to a supply chain using corresponding LPP changes as illustrated in FIG. 6, in accordance with an embodiment.

FIG. 7 illustrates method 700 of applying functional changes to a supply chain using corresponding LPP changes as illustrated in FIG. 6, in accordance with an embodiment. Method 700 proceeds by one or more activities, which although described in a particular order may be performed in one or more permutations, according to particular needs. Additionally or in the alternative, embodiments contemplate solver 204 automatically calculating supply chain input changes by analyzing and comparing input data of a base run with input data of a new run. According to this embodiment, solver 204 may perform only the activities of method 700 corresponding to the category of the identified changes.

At activity 702, solver 204 adds new non-lateable demands. According to embodiments, a functional change comprising addition of a new non-lateable demand requires solver 204 to modify the LPP to include a new variable. Changing an LPP to add a new variable is a $\Delta DF$. At activity 704, solver 204 alters a priority of a demand. According to one embodiment, functional changes comprising an altered demand priority requires solver 204 to change the objective coefficient. Changing an LPP to alter priority of a demand is a $\Delta DF$. At activity 706, solver 204 modifies a need quantity of an existing demand. According to an embodiment, changes in a need quantity of existing demand require solver 204 to change the upper bound of an existing variable, which is a $\Delta PF$. At activity 708, solver 204 modifies a need date of an existing demand. According to embodiments, solver 204 modifies a need date of an existing demand using three LPP changes: adding a new demand (as described in connection with activity 702), changing a priority a demand by changing the objective coefficient of an existing demand to zero (as described in connection with activity 704), and changing a need quantity of an existing demand to zero (as described in connection with activity 706). By applying changes in a need date as a combination of three changes, solver 204 applies LPP changes that each comprise only a $\Delta$PF or a $\Delta$DF, but not both.

At activity 710, solver 204 adds a new lateable demand. According to embodiments, solver 204 adds a new lateable demand by including new variables and a new constraint with only new variables, such that the new constraint is feasible when the new variables are set at zero. Addition of a new lateable demand may be categorized as a $\Delta$DF by performing the following basis modifications so that the modified basis remains primal feasible: setting the newly added constraint at the lower bound in the starting basis; and one variable in the newly added constraint is set as a basic variable in the starting basis.

At activity 712, solver 204 adds a Work-In-Progress (WIP). According to embodiments, addition of WIP requires solver 204 to change the right-hand side value of a constraint. Addition of WIP may be categorized as $\Delta$PF. At activity 714, solver 204 modifies an existing WIP quantity. According to embodiments, a change in WIP quantity requires solver to modify the right-hand side value of the constraint; this LPP change is a $\Delta$PF. At activity 716, solver 204 modifies a WIP date. According to embodiments, altering a WIP date requires solver to apply an LPP change to the right-hand side value of a constraint, which is a $\Delta$PF.

At activity 718, solver 204 modifies a capacity of a resource. According to embodiments, solver 204 changes a resource capacity by adjusting the upper bound of a variable; this LPP change is a $\Delta$PF. At activity 720, solver 204 fixes an operation plan to a fixed quantity. According to embodiments, fixing an operation plan to a fixed quantity requires solver 204 to change the lower bound and the upper bound of a variable and is a $\Delta$PF.

Once the changes in the supply chain input data 210 are categorized as $\Delta$DF and/or $\Delta$PF, solver 204 may solve subsequent runs of a multi-objective hierarchical LPP by applying LPP changes 606 according to the order described in method 700 using the optimal basis of a previous runs. According to embodiments, solver 204 may more efficiently solve subsequent runs of a multi-objective hierarchical LPP by using:

(1) the optimal basis of the solution for the same objective of base run 300, as described in connection with FIGS. 8 and 9; or
(2) the optimal basis of the solution for the last objective of base run 300, as described in connection FIGS. 10 and 11.

Figure 8:
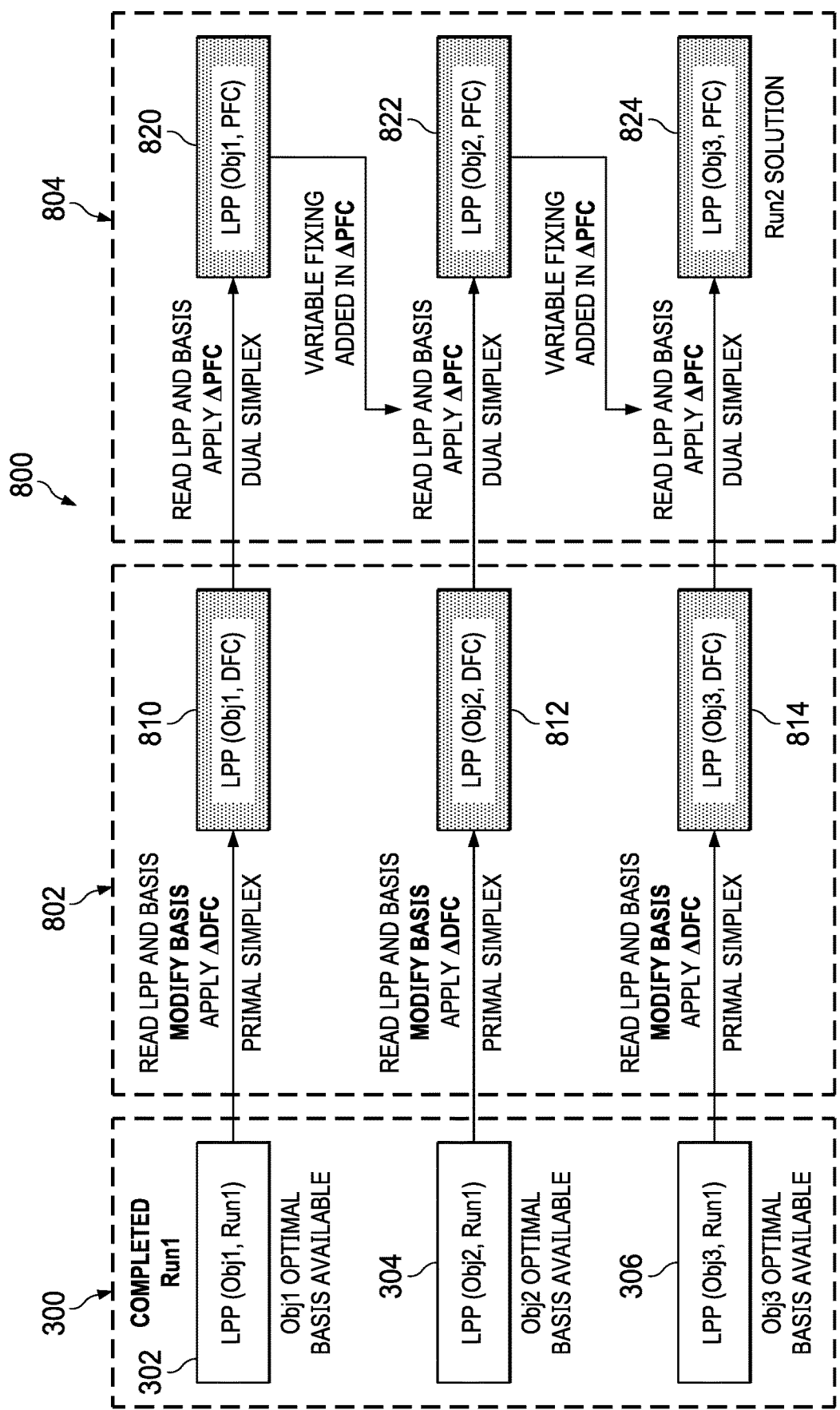
FIG. 8 illustrates a diagram of a solving a multi-objective hierarchical LPP using an optimal basis of the same objective of a previous run and categorization of supply chain changes, in accordance with an embodiment.

FIG. 8 illustrates diagram 800 of solving a multi-objective hierarchical LPP using an optimal basis of the same objective of a previous run and categorization of supply chain changes, in accordance with an embodiment. As stated above Run1 300 comprises solutions 302-306, comprising the results of a solve to each of three objectives (Obj1, Obj2, and Obj3) of the hierarchical multi-objective LPP: solution of LPP for Obj1 302; solution of LPP for Obj2 304; and solution of LPP for Obj3 306. Also, as stated above, Obj1 comprises improve demand satisfaction, Obj2 comprises maximizing usage of primary resources, and Obj3 comprises planning items as just-in-time (JIT) as possible. Although exemplary objectives are shown and described, embodiments contemplate any objective represented by minimizing or maximizing any suitable objective function, according to particular needs. According to the illustrated embodiment, base run (Run1 300) comprising a first solve of a multi-objective hierarchical LPP is independent of $\Delta$DF run 802 and $\Delta$PF run 804.

As described in more detail in connection with FIG. 9, solver 204 uses the optimal basis of solutions 302-306 for each objective in Run1 300 (e.g. the previous run from which the optimal basis is modified) to more efficiently solve the same objective in a current run (e.g. a subsequent run which uses, as a starting basis, the modified optimal basis of the base run). Subsequent runs may be solved more efficiently by modifying the optimal basis of solutions 302-306 of each of the objectives of the previous run to create the starting basis for the LPP solve of each objective of the $\Delta$DF run 802 for the same objective using the primal simplex method, generating: $\Delta$DF run solution of LPP for Obj1 810; $\Delta$DF run solution of LPP for Obj2 812; and $\Delta$DF run solution of LPP for Obj3 814. Solver 204 may then modify the optimal basis generated for each $\Delta$DF solution 810-814 for $\Delta$PF and solve the LPP for each of the same objectives during $\Delta$PF run 804 with the dual simplex method generating: $\Delta$PF run solution of LPP for Obj1 820; $\Delta$PF run solution of LPP for Obj2 822; and $\Delta$PF run solution of LPP for Obj3 824.

Figure 9:
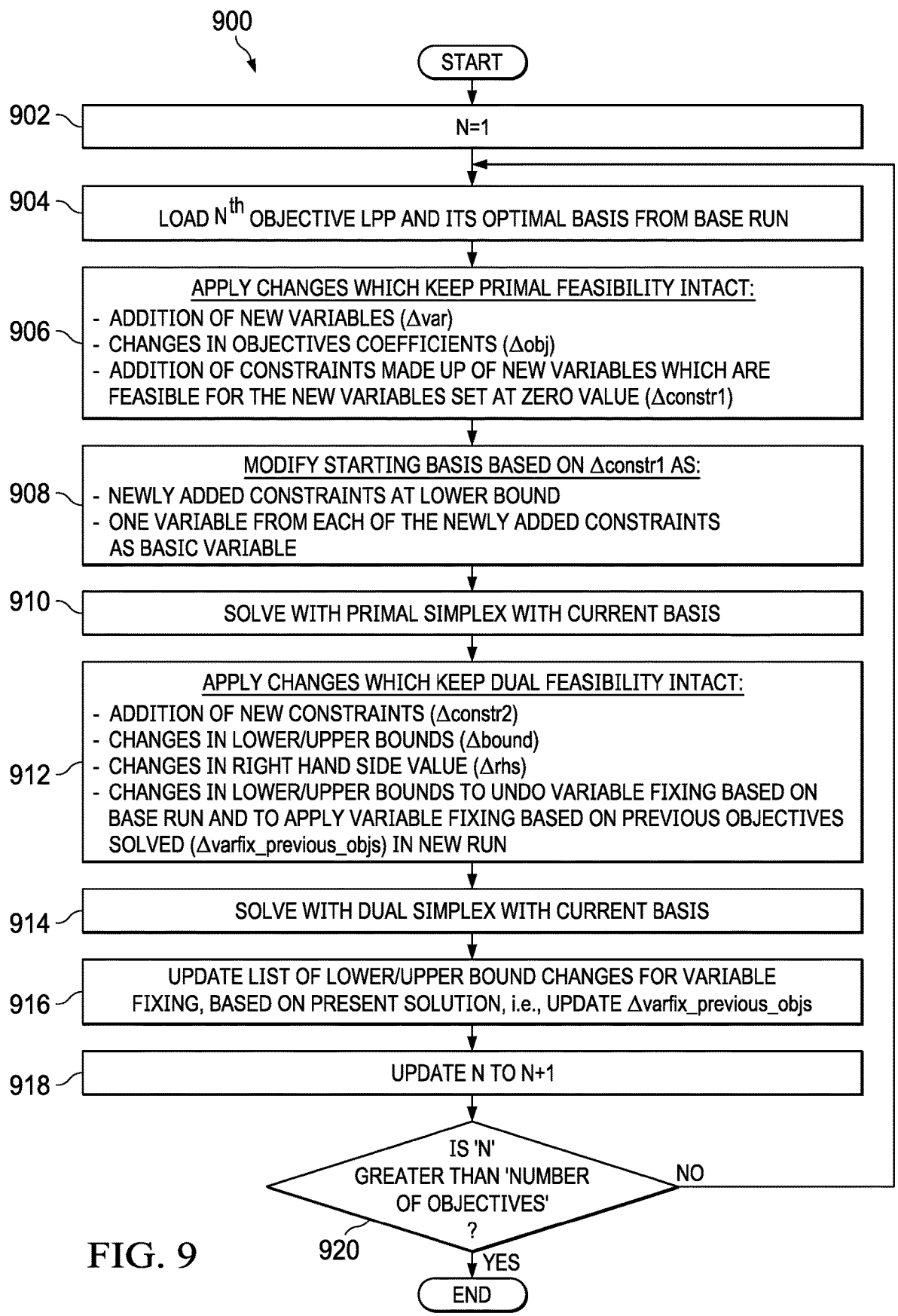
FIG. 9 illustrates a method of solving a multi-objective hierarchical LPP using an optimal basis of the same objective of a previous run and categorization of supply chain changes, in accordance with an embodiment.

Byway of further explanation and not of limitation, a non-limiting example is given in connection with FIG. 9.

FIG. 9 illustrates method 900 of solving a multi-objective hierarchical LPP using an optimal basis of the same objective of a previous run and categorization of supply chain changes, in accordance with an embodiment. Method 900 of solving a multi-objective hierarchical LPP using an optimal basis of the same objective of a previous run and categorization of supply chain changes proceeds by one or more activities, which although described in a particular order may be performed in one or more permutations, according to particular needs.

Method 900 begins at activity 902, where solver 204 sets a counter N equal to one. As stated above, the counter N represents the current objective level in a hierarchy of objectives of a hierarchical multi-objective LPP. At this activity, solver 204 sets the counter at one and begins solving a second run of a multi-objective hierarchical LPP for the first objective based on the optimal basis of a base run.

At activity 904, solver 204 loads the LPP and the optimal basis of the $N^{th}$ objective of the base run. When the counter N equals 1, the Nth objective is the first objective, and solver 204 loads the multi-objective hierarchical LPP for the first objective and the optimal basis from the solve of the first objective from the base run.

At activity 906, solver 204 applies dual feasibility changes ($\Delta$DF). As stated above, supply changes that comprise $\Delta$DF are: addition of new variables ($\Delta$var), changes in objective coefficients ($\Delta$obj), and addition of a constraint made up of new variables ($\Delta$constr1). For example, as described above, addition of a new demand (non-lateable) requires addition of a new variable, changes in demand priority requires changes in the objective coefficient, and addition of a new lateable demand requires setting newly added constraints at lower bound in starting basis; and one variable in newly added constraint is set as basic variable in starting basis.

At activity 908, solver 204 modifies the starting basis based on $\Delta$constr1 (i.e. addition of new constraint made up of new variables such that the constraint is feasible when all new variables are set at zero value). According to embodiments, addition of new constraint having only new variables (i.e. $\Delta$constr1) is $\Delta$DF, which retains primal feasibility. Addition of a new constraint may affect primal feasibility, but modifications of the basis results in a primal feasible basis to LPP with $\Delta$constr1 changes because the new constraint comprises only new variables and is feasible when the new variables are set at zero value, such as, for example, addition of lateable demand, by setting newly added constraint at lower bound in starting basis; and setting one variable in newly added constraint as basic variable in starting basis.

At activity 910, solver 204 solves the current LPP with ΔDF using the primal simplex method by reading the current starting basis, as described above.

At activity 912, solver 204 applies primal feasibility changes (ΔPF) According to embodiments, ΔPF keep dual feasibility intact and comprise addition of new constraints (Δconstr2), changes in lower/upper bounds (Δbound), changes in right hand side value (Δrhs), and changes in lower/upper bounds to undo variable fixing based on the base run and to apply variable fixing based on previous objectives solved (Δvarfix_previous_objs) in a new run. According to embodiments, solver 204 fixes the variables to their lower/upper bounds to ensure that while solving a lower objective in the hierarchy, objective values of its higher objectives are not deteriorated. As stated above, variable fixing involves changes in lower and/or upper bounds of variables, which is a ΔPF.

At activity 914, solver 204 solves the current LPP after both ΔDF and ΔPF are added, using the dual simplex method by reading a current starting basis comprising the optimal basis of the multi-objective hierarchical LPP with the ΔDF. In addition, because the current starting basis is the optimal basis of the LPP to which additional ΔPF changes are added, the current starting basis is dual feasible to the current LPP.

At activity 916, solver 204 updates the list of lower/upper bound changes required for variable fixing based on the current solution by updating the Δvarfix_previous_objs. According to embodiments, the variable fixing bounds ensure that lower objectives (of the current run) do not deteriorate the objective value of current objective (of the current run).

At activity 918, solver 204 increases the counter by one. According to embodiments, the counter N is set to N+1. Continuing with the previous example of N=1, the counter N is set to N=2, and solver 204 may load the multi-objective hierarchical LPP for the second objective and the optimal basis of the solution of the $2^{nd}$ objective from the base run.

At activity 920, solver 204 checks whether the counter N is greater than the number of objectives. Solver 204 iteratively solves the multi-objective hierarchical LPP during a second run beginning with a first objective (N=1) until each objective level has been solved. Solver 204 determines when the last objective has been solved for the second run by checking whether counter N is greater than the number of objectives.

When solver 204 determines the counter is greater than the number of objectives, method 900 ends. However, when solver 204 determines the counter is not greater than the number of objectives, method 900 returns to activity 904. Solver 204 iteratively solves additional objectives of the multi-objective hierarchical LPP as described above in connection with activities 904-920 until solver 204 determines the counter is greater than the number of objectives at activity 920, at which point method 900 ends.

Figure 10:
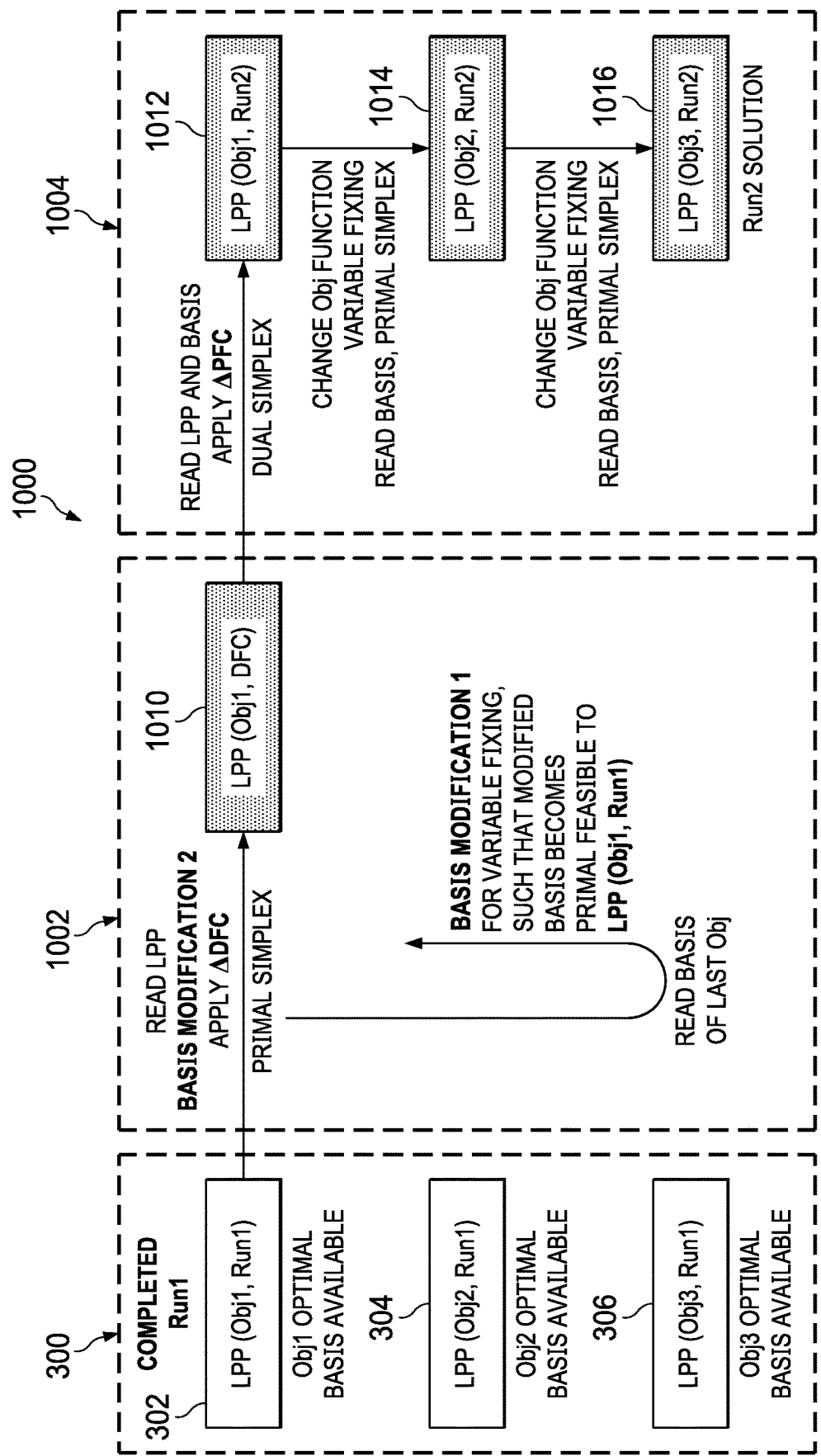
FIG. 10 illustrates a diagram of solving a multi-objective hierarchical LPP using an optimal basis of the last objective of a previous run and categorization of supply chain changes, in accordance with an embodiment.

FIG. 10 illustrates diagram 1000 of solving a multi-objective hierarchical LPP using an optimal basis of the last objective of a previous run and categorization of supply chain changes, in accordance with an embodiment. Diagram 100 is explained in connection with exemplary Run1 300 comprising three objectives (Obj1, Obj2, and Obj3) of the hierarchical multi-objective LPP and solution of LPP for Obj1 302; solution of LPP for Obj2 304; and solution of LPP for Obj3 306, as described above. Although exemplary objectives are shown and described, embodiments contemplate any objective represented by minimizing or maximizing any suitable objective function, according to particular needs.

As described in more detail in connection with FIG. 11, solver 204 uses the optimal basis of base run solution of LPP for the last objective, Obj3 306 in Run1 300 (e.g. the previous run from which the optimal basis is modified) to more efficiently solve the first objective in the ΔDF run, and the optimal basis of the first objective of the ΔDF run is used to more efficiently solve the first objective in a ΔPF run. Solver 204 may then use each optimal basis of an objective in a ΔPF run to solve the subsequent objective in the ΔPF run until reaching the last objective of the ΔPF run. For example, subsequent runs may be solved more efficiently by modifying the optimal basis of base run solution of LPP for Obj3 306 in Run1 300 to create the starting basis for the LPP solve of the first objective of the ΔDF run 1002 for the first objective using the primal simplex method, generating: ΔDF run solution of LPP for Obj1 1010. Solver 204 may then modify the optimal basis generated for ΔDF run solution of LPP for Obj1 1010 with ΔPF to solve the LPP for the first objective of ΔPF run 1004 with the dual simplex method generating ΔPF run solution of LPP for Obj1 1012. Finally, solver 204 uses the optimal basis of ΔPF run solution of LPP for Obj1 1012 with the primal simplex method to generate: ΔPF run solution of LPP for Obj2 1014, and, iteratively performs the same activity to generate ΔPF run solution of LPP for Obj3 1016.

Figure 11:
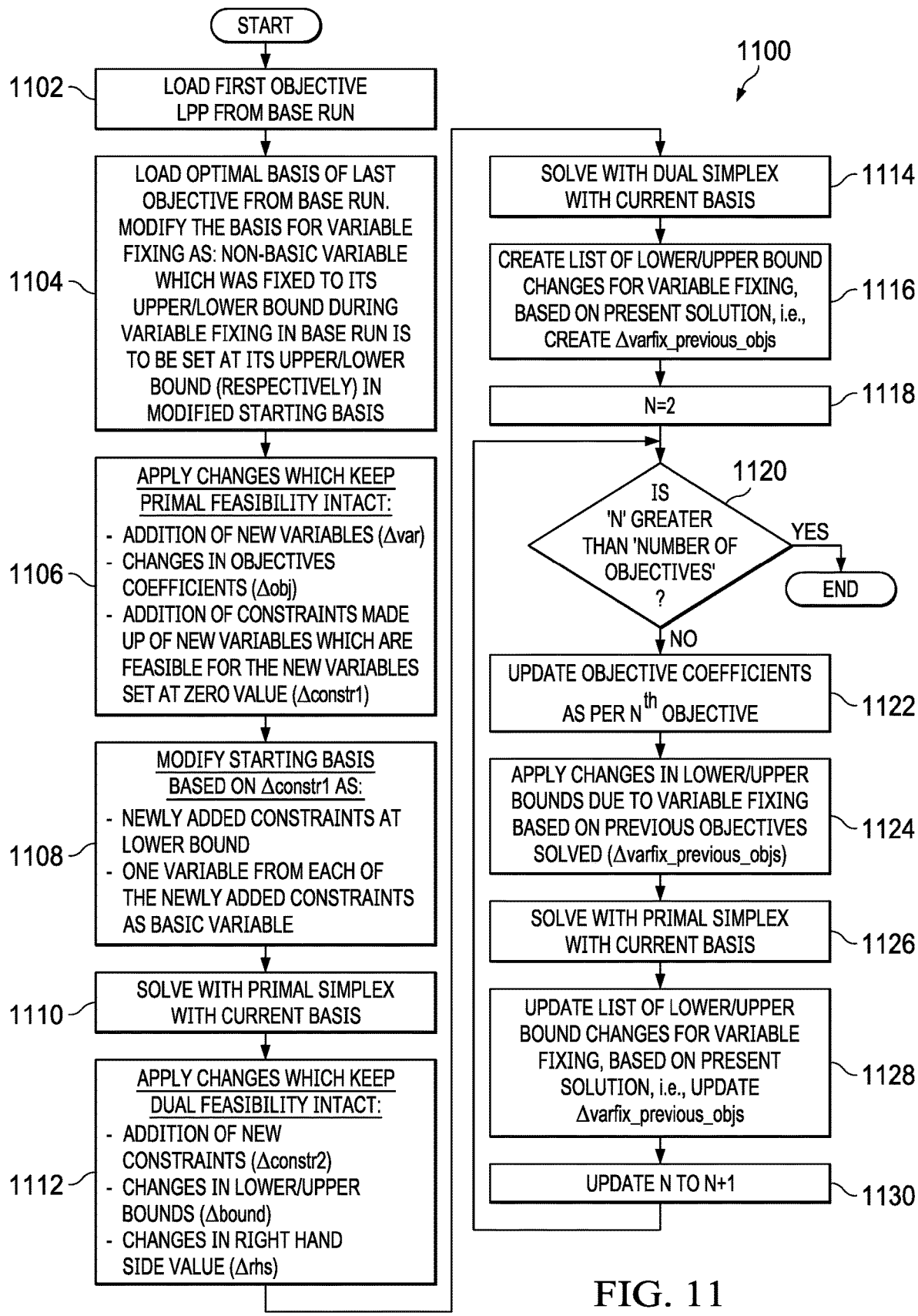
FIG. 11 illustrates a method of solving a multi-objective hierarchical LPP using an optimal basis of the last objective of a previous run and categorization of supply chain changes, in accordance with an embodiment.

Byway of further explanation and not of limitation, a non-limiting example is given in connection with FIG. 11.

FIG. 11 illustrates method 1100 of solving a multi-objective hierarchical LPP using an optimal basis of the last objective of a previous run and categorization of supply chain changes, in accordance with an embodiment. Method 1100 of solving a multi-objective hierarchical LPP using an optimal basis of the last objective of a previous run and categorization of changes of the supply chain input data 210 proceeds by one or more activities, which although described in a particular order may be performed in one or more permutations, according to particular needs. According to embodiments, solver 204 of supply chain planner 110 efficiently solves the objectives in a new run (e.g. a second run or subsequent run) using an optimal basis of the last objective in base run 300 (e.g. a first run or previous run).

At activity 1102, solver 204 loads into memory the LPP and the first objective from a base run. As stated above, solver 204 loads the multi-objective hierarchical LPP comprising the first objective (such as, for example, Obj1).

At activity 1104, solver 204 loads the optimal basis of the last objective from the base run as a starting basis, and modifies the basis based on variable fixing of the base run for the first objective. According to embodiments, the starting basis for the first objective (such as, for example, Obj1) in the current run is derived from the optimal basis of last objective (such as, for example, Obj3) of base run 300 by modifying the optimal basis of the last objective in base run 300 to be primal feasible to the first objective in the base run, as follows: when the variable is non-basic in the current starting basis and was fixed to its upper bound as part of variable fixing during the base run, solver 204 sets this variable to its upper bound in the current basis; and when the variable is non-basic in the current starting basis and was fixed to its lower bound as part of variable fixing during the base run, solver 204 sets this variable to its lower bound in current basis.

At activity 1106, solver 204 applies dual feasibility changes (ΔDF). As stated above, changes to the supply chain that are ΔDF comprise: addition of new variables (Δvar), changes in objective coefficients (Δobj), and addition of a constraint made up of new variables (Δconstr1), as described above.

At activity 1108, solver 204 modifies the starting basis based on Δconstr1 (i.e. addition of new constraint made up of new variables such that the constraint is feasible when all new variables are set at zero value). According to embodiments, addition of new constraint having only new variables (i.e. Δconstr1) as ΔDF, which retains primal feasibility. Addition of a new constraint may affect primal feasibility, but modifications in the basis maintain a primal feasible basis for solving the LPP with Δconstr1 changes because the new constraint comprises only new variables and is feasible when the new variables are set at zero value, such as, for example, addition of lateable demand, by setting newly added constraint at lower bound in starting basis; and setting one variable in newly added constraint as basic variable in starting basis.

At activity 1110, solver 204 solves the current LPP with the ΔDF changes using the primal simplex method by reading the current starting basis. At activity 1112, solver 204 applies primal feasibility changes (ΔPF) According stated above, ΔPF comprise addition of new constraints (Δconstr2), changes in lower/upper bounds (Δbound), and changes in right hand side value (Δrhs).

At activity 1114, solver 204 solves the current LPP comprising both ΔDF and ΔPF using the dual simplex method by reading a current starting basis comprising the optimal basis of the multi-objective hierarchical LPP with the ΔDF. In addition, because the current starting basis is the optimal basis of the LPP to which additional ΔPF changes are added, the current starting basis is dual feasible to the current LPP. At activity 1116, solver 204 updates the list of lower/upper bound changes required for variable fixing based on the current solution by updating Δvarfix_previous_objs.

At activity 1118, solver 204 sets the counter N to N=2. According to embodiments, the counter represents the number of iterations of the supply chain solving method, and solver 204 continues to iteratively solve the multi-objective hierarchical LPP until each objective has been solved (e.g. N is greater than the number of objectives).

At activity 1120, solver 204 determines whether the counter (i.e. current objective count) is greater than the number of objectives. When the counter is greater than the number of objectives, method 1100 ends. When the counter is not greater than the number of objectives, method 1100 continues to activity 1122. At activity 1122, solver 204 updates the objective function of the current LPP according to the $N^{th}$ objective in the new run. For example, continuing with the previous example, solver 204 may update the objective function from Obj1 to Obj2 when N=2, and from Obj2 to Obj3 when N=3, as described above.

At activity 1124, solver 204 applies changes in lower/upper bounds due to variable fixing based on previous objectives solved (Δvarfix_previous_objs). According to embodiments, solver 204 fixes the variables to their lower/upper bounds to ensure that while solving a lower objective in the hierarchy, objective values of its higher objectives are not deteriorated. Variable fixing involves changes in lower/upper bounds of variables and is a ΔPF.

At activity 1126, solver 204 solves the current LPP using the primal simplex method by reading the current starting basis comprising is the optimal basis of previous objective of the new run. At activity 1128, solver 204 updates the list of lower/upper bound changes required for variable fixing based on the current solution by updating Δvarfix_previous_objs. At activity 1130, solver 204 increases the counter N (i.e. current objective count) by one, and solver 204 returns to activity 1120 and determines if the counter is greater than the number of objectives. Solver 204 may continue iteratively solving additional objectives of the multi-objective hierarchical LPP as described above until the counter is greater than the number of objectives, at which point method 1100 ends.

According to embodiments, solver 204 repeats activities 1120-1132 and derives the final optimal basis from the first objective LPP of the new run from final optimal basis of the base run. According to embodiments comprising large supply chain changes (referred to as macro-changes, described in more detail, below) between the base run and the new run, the final optimal basis of base run may comprise common basic variables with the final optimal basis of the new run. According to these embodiments, solving a multi-objective hierarchical LPP using the final optimal basis of the base run while solving the new run may reduce the number of simplex method iterations and increase the performance advantage of the solve when compared with other solving methods.

As described in further detail below, method 1100 may solve macro changes more efficiently than method 900, while both methods solve micro changes efficiently. According to embodiments, method 400, method 900, and method 1100 are compared for several datasets by solving a multi-objective hierarchical LPP for a base run; solving the multi-objective hierarchical LPP with changes to the supply chain input data 210 using method 400; solving the multi-objective hierarchical LPP with changes to the supply chain input data 210 using method 900 and solution information from the base run; solving the multi-objective hierarchical LPP with changes to the supply chain input data 210 using method 1100 and solution information from the base run, and comparing the runtimes, objective values, and number of iterations.

FIGS. 12A and 12B illustrate chart 1200 comprising results of solving multi-objective hierarchical LPP with micro-changes between a base run and a current run, in accordance with an embodiment. Micro-changes, which may also be referred to as unit changes, comprise, for example, changes to the supply chain between the base run and a new run that comprise only a single change. Chart 1200 comprises eighteen trials (Exp. No. 1202) for three exemplary datasets 1204 (Dataset 1, Dataset 2, and Dataset 3) comparing method 400 with method 900 and method 1100 (Method 400 Run Time 1206, Method 900 Run Time 1208, Improvement of Method 900 over Method 400 (times) 1210, Improvement of Method 900 over Method 400 (% of solve time) 1212, Method 1100 Run time 1214, Improvement of Method 1100 over Method 400 (times) 1216, Improvement of Method 1100 over Method 400 (% of solve time) 1218) for single changes which are indicated by Unit Change Description 1220 (demand addition 1222, demand need date change 1224, demand need quantity change 1226, demand priority change 1228, capacity change 1230, WIP change 1232, and fixed operation plan 1234. In the first dataset (represented by Exp. No. 1202 of 1-6), the tested unit changes comprise: demand addition 1222, demand need date change 1224, demand priority change 1228, capacity change 1230, WIP change 1232, and fixed operation plan 1234. For the second and third datasets (represented by Exp. No. 1202 of 7-12 and 13-18, respectively) the unit changes comprise: demand addition 1222, demand need quantity change 1226, demand priority change 1228, capacity change 1230, WIP change 1232, and fixed operation plan 1234.

As may be seen by referring to the illustrated embodiment, method 900 was 1.65 times faster than method 400 when solving demand addition 1222 in the first dataset, while method 1100 was 7.59 times faster than method 400. In seventeen of eighteen trials, method 900 and method 1100 were faster than method 400. Method 900 took less than 6% of the run time of method 400 in thirteen of the eighteen trials. Method 1100 took less than 20% of the run time of method 400 in seventeen of the eighteen trials. In fourteen out of eighteen trials, method 900 was faster than method 1100 when solving the exemplary multi-objective hierarchical LPP. However, in four of the eighteen trials, method 1100 was faster than method 900.

FIGS. 13A and 13B illustrate chart 1300 of results with macro-changes between a base run and a current run, in accordance with an embodiment. According to some embodiments, at least two changes in the supply chain between a base run and a new run may be referred to as macro changes. Chart 1300 comprises eleven trials (Exp. No. 1302) for three exemplary datasets 1304 (Dataset A, Dataset B, and Dataset C) comparing method 400 with method 1100 (Method 400 Run Time 1306, Method 1100 Run Time 1308, Improvement of Method 1100 over Method 400 (times) 1310, Improvement of Method 1100 over Method 400 (% of solve time) 1312) for macro-changes comprising: WIP changes 1314, Demand changes 1316, and operation plan changes 1318. WIP changes 1314 comprise, for example, WIP is carried forward from day one to day two, and day one supplies are set to zero. Demand changes 1316 comprise, for example, various percentage changes of need quantities. Operation plan changes 1318 comprise for example, moving operations from one day to another, or setting operations on a particular day at zero. As illustrated in chart 1300, in all eleven trials for the three exemplary datasets, method 1100 is significantly faster than method 400 (4-60% faster).

In addition, method 1100 often performs better than method 900 for solving supply chain planning problems modeled as multi-objective hierarchical LPP with macro changes, while both method 900 and method 1100 may efficiently solve supply chain planning problems modeled as multi-objective hierarchical LPP with micro changes.

In addition to the methods presented above, universal method 1500 (FIG. 15) is presented below which provides for considering all types of changes to the input supply chain problem between a first run and a second run according to two classifications: only dual feasibility changes (i.e. ΔDF) and only primal feasibility changes (i.e. ΔPF). As disclosed above, method 900 and method 1100 identify changes in demands, capacity, WIP, and other dynamic supply chain data, such as, for example, the following:

Changes in Objective Coefficients (e.g. Demand priority change)
Changes in RHS value (e.g. WIP Qty change)
Changes in Variable Bounds (e.g. Demand Qty change)
Addition of new variables (e.g. New Shortable Demand)
Addition of new constraints (e.g. New Lateable Demand)

In addition to these changes, universal method 1500 identifies changes in the static and dynamic data of supply chain input data 210 that include:

Changes in Constraint and/or Variable Coefficients (e.g. Resource Production Rate change)
Removal of new variables (e.g. Removal of SKU/Resource)
Removal of new constraints (e.g. Removal of SKU/Resource)

Universal method 1500 identifies and models changes to the static supply chain data, such as, for example, a resource that is no longer available, the introduction of new SKUs and new items, and the like.

In one embodiment, universal method 1500 may solve a master planning problem where Run1 300 represents a previous period's master planning problem (e.g. yesterday) and Run2 1402 (FIG. 14) represents a current period's master planning problem (e.g. today). According to another embodiment, Run1 300 may represent a solution to base run of a supply chain planning problem, and Run2 1402 may represent a scenario generated as a modification of the base run. Other embodiments may include Run1 300 comprising a campaign planning heuristic for reducing setup times, and Run2 1402 is any of the subsequent iterations of the LPP that must be solved to calculate the reduced setup times. Although Run1 300 and Run2 1402 are described as comprising two runs for two particular time periods, embodiments contemplate any number of runs comprising any suitable planning horizon or period of any suitable length of time (such as, for example, any number of hours, days, weeks, months, seasons, years, or the like) to generate any optimal solution, according to particular needs.

Figure 14:
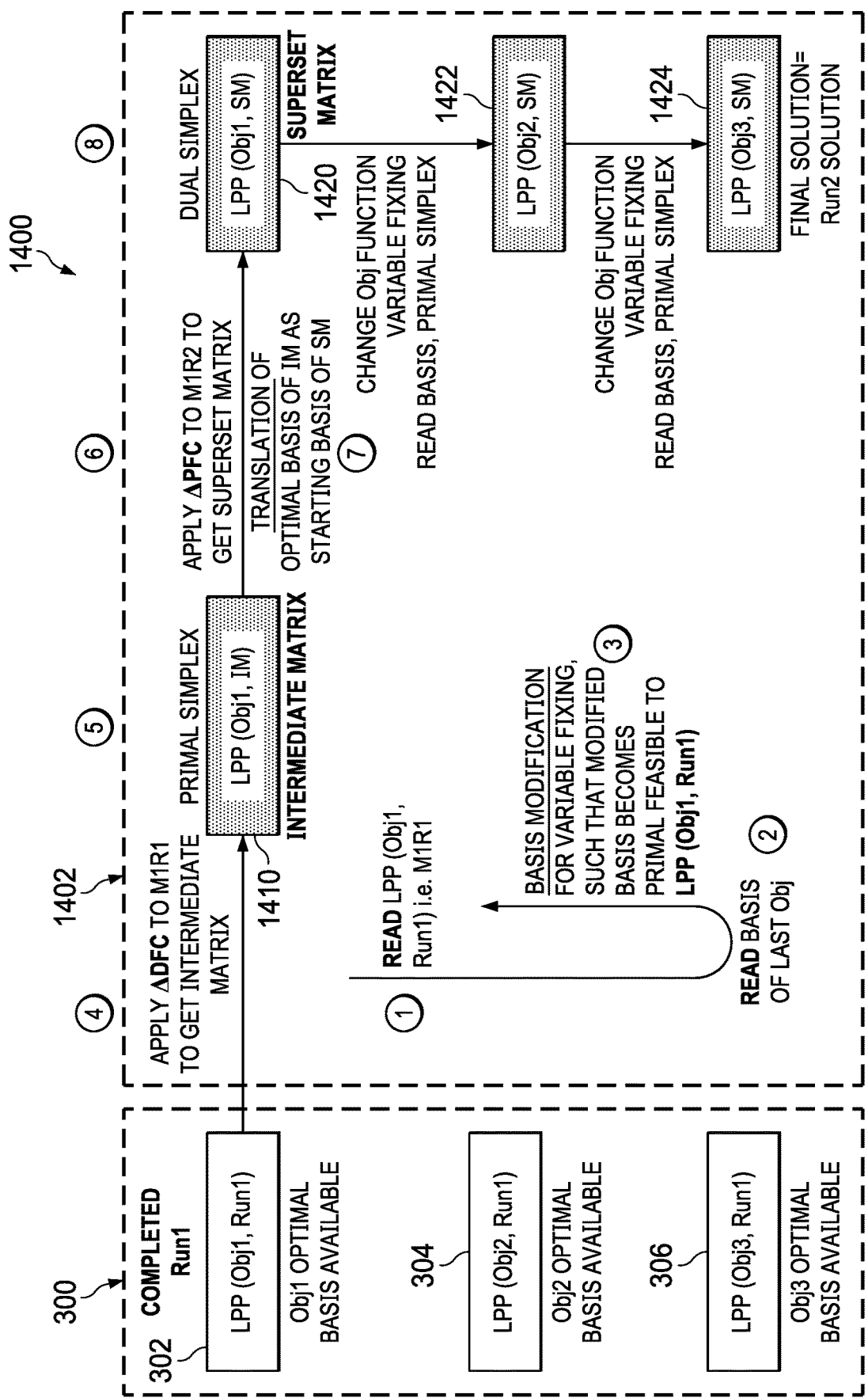
FIG. 14 illustrates a diagram of solving a multi-objective hierarchical LPP using the universal method of FIG. 15, in accordance with an embodiment.

FIG. 14 illustrates diagram 1400 of solving a multi-objective hierarchical LPP using universal method 1500, in accordance with an embodiment. In the example of universal method 1500 shown in FIG. 14, Run1 300 of the hierarchical multi-objective LPP comprises solutions for three objectives (Obj1 302, Obj2 304, and Obj3 306) and Run2 1402 comprises an intermediate matrix "IM" 228 generated for the solution of Obj1 1402 of Run2 1402 and superset matrix 230 "SM" generated from intermediate matrix 228 for solutions of three objectives (Obj1 1420, Obj2 1422, and Obj3 1424) of Run2 1402. Although particular objectives are shown and described, embodiments contemplate any number and combination of suitable objectives represented by minimizing or maximizing any suitable objective function, according to particular needs.

As described in more detail in connection with FIG. 15, solver 204 uses the optimal basis of the solution 306 of the LPP for the last objective, Obj3 in Run1 300 (e.g. the previous run from which the optimal basis is modified) to more efficiently generate the solutions for the first objective 1410 and 1420 of Run2 1402 (e.g. the current run). For example, a current run, Run2 1402 may be solved more efficiently by modifying the optimal basis of the base run solution 306 of the LPP for Obj3 in Run1 300 to create the starting basis for the LPP solve of the first objective of Run2 1402 using a series of intermediate transformations.

In one embodiment, the LPP for each objective in each run is modeled as an LP matrix. The LPP for solving the first objective of Run1 300 is modeled by LP matrix M1R1 and the LPP for solving the first objective of Run2 is modeled by LP matrix M1R2, as described in further detail in connection with FIG. 20. For example, modeler 210 of server 112 models a supply chain planning problem as a hierarchical multi-objective LPP comprising an LP constraint-variable matrix. According to embodiments, an LPP is represented as a matrix formulation comprising LP constraints and variables. According to embodiments, the LP constraint-variable matrix comprises a matrix having one or more rows, representing LP supply chain master planning constraints, and one or more columns, representing the variables for those constraints. In addition, the LP constraint-variable matrix comprises an objective, and lower/upper bounds of variables.

The input changes between the LPP of Run1 300 and Run2 1402 (i.e. changes to supply chain input data 210 that have occurred between a previous run and a current run) are categorized as ΔDF and ΔPF. The following list discloses all possible changes to an LPP between a first run and a second run and the feasibility change associated with each change:

1. Add Variable=>Dual Feasibility Change
2. Add Constraint=>Primal Feasibility Change
3. Change Objective coefficient=>Dual Feasibility Change
4. Change RHS=>Primal Feasibility Change
5. Change Variable Bounds=>Primal Feasibility Change
6. Remove Variable=>Primal Feasibility Change
7. Remove Constraint=>Dual Feasibility Change
8. Change in Constraint Coefficient=>Dual Feasibility Change+Primal Feasibility Change The feasibility change for supply chain input changes 1-5 are described in connection with FIG. 6, above. The feasibility change for supply chain input changes 6-8 are now described in further detail.

6. Remove Variable

According to an embodiment, the removal of a variable is modelled by setting the Upper Bound and the Lower Bound of the variable to zero, which is categorized as an only primal feasibility change (i.e. ΔPF). In order to preserve basic variables from the previous solve, solver 204 does not remove variables. Instead, the removal of the variable is modeled by setting the upper and lower bound to zero, which makes the variable ineffective in the current solve but also retains its information.

7. Remove Constraint

The removal of a constraint is modelled by adding a positive violation variable and a negative violation variable in the constraint, which is categorized as an only dual feasibility change (i.e. ΔDF). In order to preserve the constraints from the previous solve, solver 204 does not remove the constraints. Instead, the removal of the constraints is modeled by adding positive and negative violation variables.

8. Change in Constraint Coefficient

A change in a constraint coefficient is modelled by removing the Constraint (or Variable) with the old coefficient and adding a new Constraint (or Variable) with a new coefficient. According to embodiments, the change in a coefficient may be modelled as a combination of two changes. In a first activity, solver 204 adds a new constraint (or variable) with the new coefficient. In a second activity, solver 204 removes the existing constraint (or variable) with the old coefficient. Accordingly, this change falls under both categories: ΔPF and ΔDF. The change in a variable may be modelled in a similar manner as the constraint: solver 204 removes the variable with the old coefficient and adds the variable with the new coefficient.

Returning to FIG. 14, solver 204 may categorize all supply chain changes as either ΔDF and ΔPF, wherein ΔDF is objective coefficient changes, added variables, and removed constraints, and wherein ΔPF is RHS changes, bound changes, added constraints, and removed variables. Solver 204 may then apply the ΔDF to M1R1 to generate intermediate matrix 228, and apply the ΔPF to M1R2 to generate Superset Matrix 230. Then, solver 204 may load the optimal basis of Run1 300, after necessary modifications, as a starting basis of intermediate matrix 228 and solve intermediate matrix 228 with primal simplex method. Next, solver 204 may translate the optimal basis of intermediate matrix 228 to the starting basis of superset matrix 230 to more quickly solve superset matrix 230 from intermediate matrix 228. Solver 204 may then solve the LPP for the first objective of Run2 1402 with the dual simplex method to generate solution 1420 of the LPP for Obj1 for Run2. Finally, solver 204 uses the optimal basis of the solution 1420 of the LPP for Obj1 with the primal simplex method to generate: the solution 1422 of the LPP for Obj2, and, iteratively performs the same activity to generate the solution 1424 of LPP for Obj3, which is the optimal solution to the LPP for Run2 1402, the current run.

Figure 15:
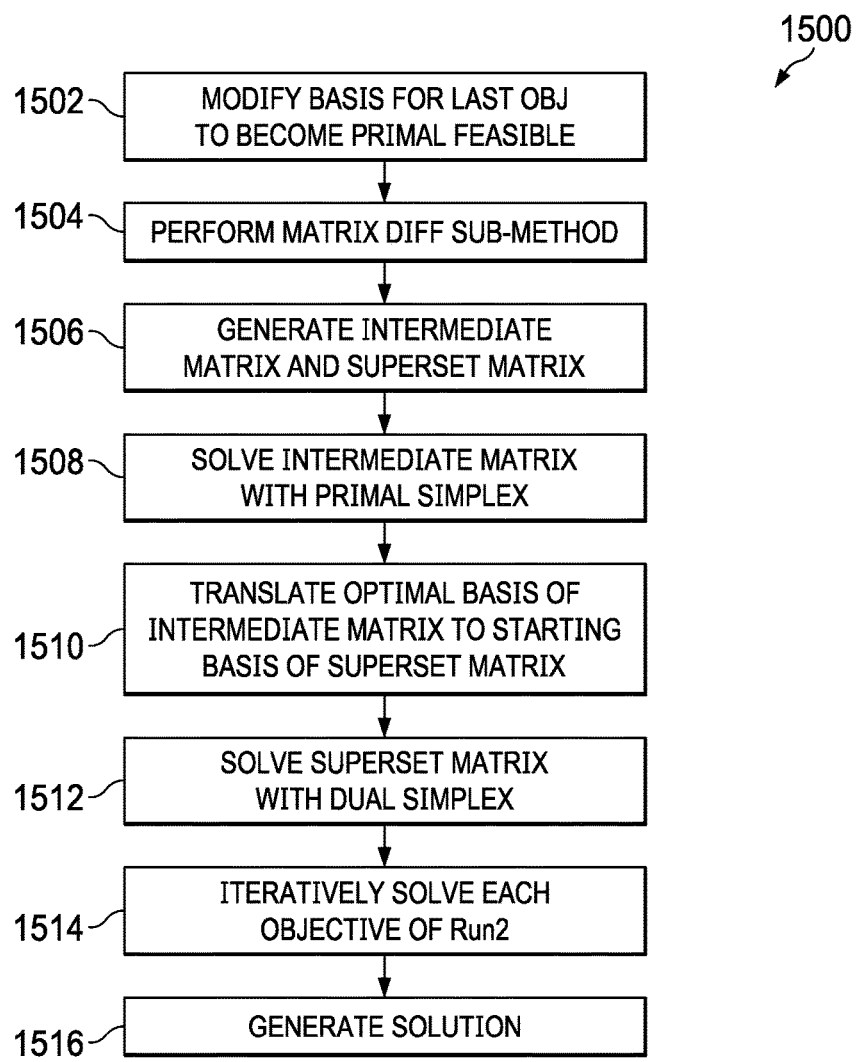
FIG. 15 illustrates a universal method for solving a multi-objective hierarchical LPP, in accordance with an embodiment.

FIG. 15 illustrates universal method 1500 for solving a multi-objective hierarchical LPP, in accordance with an embodiment. Universal method 1500 modifies the basis of a previous LPP solve to more efficiently solve a current LPP and supports all possible changes between the previous run and the current run, including, for example, removal of variables or constraints and changes in constraint or variable coefficients. Universal method 1500 proceeds by one or more activities, which although described in a particular order may be performed in one or more permutations, according to particular needs.

Universal method 1500 begins at activity 1502, where solver 204 modifies the final basis of the last objective of a previous run (e.g. Obj3 of Run1 300 in FIG. 14) to become primal feasible to the first objective LPP of previous run. At activity 1504, solver 204 performs matrix diff method 1700 (FIG. 17) to categorize variables/constraints according to: Only Run1, Only Run2 and Common. Matrix diff method 1700 is described in further detail below. Solver 204 generates intermediate matrix 228 and superset matrix 230 at activity 1506 based on the categorization of the variables and constraints. Although the intermediate and superset matrices 228-230 may be calculated by tabulating all changes between Run1 and Run2 and applying those changes, universal method 1500 may use a faster technique to create intermediate and superset matrices using list of common/Run1/Run2 constraints and variables 224 and/or corrected list of common/Run1/Run2 constraints and variables 226, as described in further detail below.

At activity 1508, solver 204 solves intermediate matrix 228 using Primal Simplex and the modified final basis of Run1. Solver 204 translates the optimal basis of intermediate matrix 228 to derive the starting basis of superset matrix 230, at activity 1510. Solver 204 solves superset matrix 230 with Dual Simplex, at activity 1512. At activity 1514, solver 204 solves the second objective, Obj2, and each subsequent objective by changing the objective function of superset matrix 230, fixing variables after each objective solve, and iteratively solving each objective until a final objective is solved. The solution of the final objective gives the solution for Run2, at activity 1518.

By way of further explanation only and not by way of limitation, universal method 1500 is described with the following examples.

As disclosed above, universal method 1500 begins at activity 1502, where solver 204 modifies the final basis of last objective of Run1 to become primal feasible to the first objective LPP of Run1. According to an embodiment, solver 204 modifies the final optimal basis (i.e. final solution) of a previous run (Run1) to account for any variable bound changes during the solve of the previous run. The modification of the optimal basis of the last objective of the previous run results in a modified basis that is primal feasible to the first objective of previous run.

Figure 16:
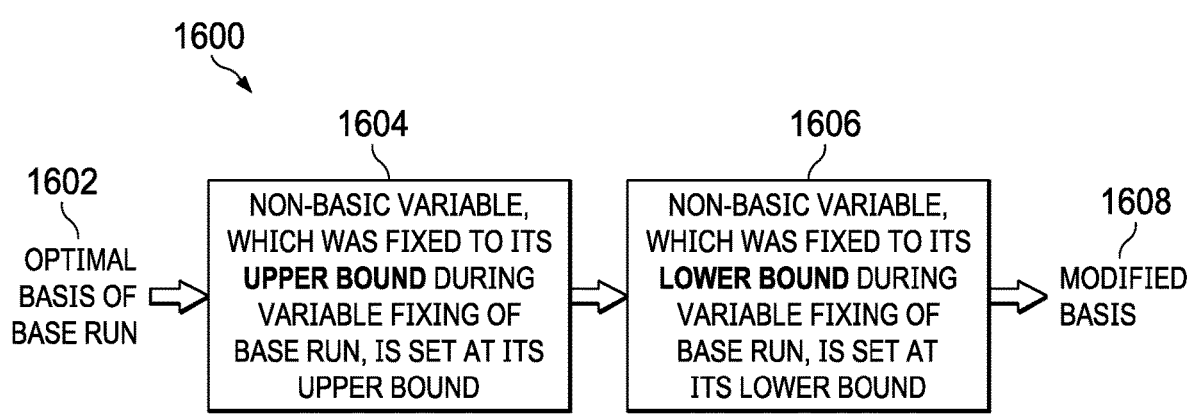
FIG. 16 illustrates a method of modification of the optimal basis of a previous run, according to an embodiment.

FIG. 16 illustrates method 1600 of modification of the optimal basis of a previous run, according to an embodiment. At activity 1602, the optimal basis of the base run (e.g., previous run, Run1, etc.) solution is received by solver 204 and is modified by solver 204 wherein each non-basic variable in the optimal basis, which was fixed to its upper bound during variable fixing of the base run, is set at its upper bound at activity 1604, and each non-basic variable in the optimal basis, which was fixed to its lower bound during variable fixing of the base run, is set at its lower bound at activity 1606. The solver generates a result at activity 1608, wherein the result is a modified basis that is primal feasible to the first objective of the base run.

As disclosed above, solver 204 performs matrix diff method 1700 to categorize variables and/or constraints according to: Only Run1, Only Run2 and Common, at activity 1504 of universal method 1500.

As disclosed above, solver 204 categorizes input changes between the LPP for the first objective of a previous run and the LPP for the first objective of a current run into two categories: dual feasibility changes and primal feasibility changes. To pass the final solution of a previous run as a warm start for a current run, solver 204 may create intermediate matrix 228 (which has only Dual Feasibility changes) and superset matrix 230 (which has Dual Feasibility changes+Primal Feasibility changes). As disclosed above, superset matrix 230 may be generated by adding ΔDF and ΔPF to the Run1 LPP. However, because this is equivalent to the Run2 LPP, the following method discloses generating superset matrix 230 using a more efficient method wherein superset matrix 230 is generated by adding constraints and variables to the Run2 LPP, which eliminates the need to track RHS changes and bound changes as well as provides less risk of numerical deviations between superset matrix 230 and the Run2 LPP (which may affect plan quality). In addition, or as an alternative, solver 204 generates intermediate matrix 228 and superset matrix 230 using matrix diff method 1700 by categorizing the variables and constraints into three categories: Only Run1, Only Run2, and Common. In other words, solver 204 generates intermediate and/or superset matrices 228-230, using matrix diff method 1700 to categorize variables and constraints into the following six categories:

1. List of Common Variables between Run1 LPP and Run2 LPP
2. List of Only Run1 Variables
3. List of Only Run2 Variables
4. List of Common Constraints between Run1 LPP and Run2 LPP
5. List of Only Run1 Constraints
6. List of Only Run2 Constraints Generating the lists is not straightforward when the supply chain problem is converted into LP formulation without significant preplanning of variable and constraint names. For example, solver 204 may generate a variable name for a particular variable in the LP formulation of the LPP during Run1 and generate a different variable name for the same variable in the LP formulation of the LPP during Run2. The names of constraints during generation of the LP formulation of the LPPs for Run1 and Run2 are treated similarly. Accordingly, solver 204 uses matrix diff method 1700 to generate the six lists while taking into account the names of variables and constraints are likely different between the LPP of Run1 and the LPP of Run2.

FIG. 17 illustrates matrix diff method 1700, according to an embodiment. According to embodiments, solver 204 uses matrix diff method 1700 to manage different variable/constraint names and derive the six lists mentioned above. Matrix diff method 1700 proceeds by one or more activities, which although described in a particular order may be performed in one or more permutations, according to particular needs.

At activity 1702, solver 204 prepares a mapping between the Run1 variable names and the Supply Chain Names of Run1 variable names. In addition, solver 204 prepares a mapping between the Run2 variable names and the Supply Chain Names of the Run2 variable names, at activity 1704.

At activity 1706, solver 204 performs three set operations:
(a) calculate the intersection of set of Run1 Supply Chain Names ∩ set of Run2 Supply Chain Names to generate the Set_Common_SupplyChainNames, which is the Common Variables in Run1 and Run2;
(b) calculate the difference between the set of Run1 Supply Chain Names—the Set_Common_SupplyChainNames to generate the set of Only Run1 variables; and
(c) calculate the difference between the set of Run2 Supply Chain Names—the Set_Common_SupplyChainNames to generate the set of Only Run2 variables.

At activity 1708, solver 204 repeats each of activities 1702-1706 of matrix diff method 1700 for constraints, instead of variables, to generate the Set_Common_SupplyChainNames for constraints in Run1 and Run2, Only Run1 constraints, and Only Run2 constraints.

By way of further explanation only and not by way of limitation, an example is given for a demand which is the same demand in both Run1 and Run2, but which is assigned a variable name in Run1 which is different than its variable name in Run2. As disclosed above, the same variable or constraint may have a different name in Run1 as it would in Run2. For example, a demand in the LPP for a supply chain problem for a previous run, yesterday, was named X1 while in the LPP for the supply chain problem for a current run, the demand is named X4. Accordingly, the variable names and constraints names are going to change from yesterday to today. To pass the optimal basis from Run1 to be used as a starting basis in Run2, the names of the variables and constraints are mapped using matrix diff method 1700 to generate the six lists, disclosed above.

At activity 1702, solver 204 generates, for Run1 variables, a mapping between the variable name and the supply chain name. Continuing the example, X1 in Run1 is mapped to a demand on Item1, Client1 on $1^{st}$ of January 2020. Similarly, for Run2, solver 204 maps X4 to a demand on Item1, Client1 on $1^{st}$ of January 2020. After mapping the variable names to the supply chain names, solver 204 performs the three set operations. The first set operation is to find the intersection of the supply chain names, which gives the list of common variables in Run1 and Run2. Next, the list of Run1 supply chain names is subtracted from the list of common names to give the list of variables that are only in Run1. Similarly, the list of Run2 supply chain names is subtracted from the list of common names to give the list of variables that are only in Run2. Accordingly, solver 204 has now generated the first three lists, as disclosed above (i.e. 1. List of Common Variables between Run1 LPP and Run2 LPP; 2. List of Only Run1 Variables; and 3. List of Only Run2 Variables). Solver 204 may then perform the same activities for the constraints to generate the final three lists, as disclosed above (i.e. 4. List of Common Constraints between Run1 LPP and Run2 LPP; 5. List of Only Run1 Constraints; and 6. List of Only Run2 Constraints).

However, when a coefficient is changed, solver 204 performs a deep compare activity 1710 to account for the coefficient change when calculating intermediate matrix 228 and superset matrix. According to embodiments, matrix diff method 1700 generates the six lists needed to generate intermediate matrix 228 and superset matrix 230. However, when coefficients of constraints and variables change, solver 204 continues to activity 1710 and performs deep compare activity to generate the following corrected lists:

1. Corrected List of Common Variables between Run1 LPP and Run2 LPP
2. Corrected List of Only Run1 Variables
3. Corrected List of Only Run2 Variables
4. Corrected List of Common Constraints between Run1 LPP and Run2 LPP
5. Corrected List of Only Run1 Constraints
6. Corrected List of Only Run2 Constraints At activity 1710, solver 204 calculates and compares a score for a pair of common variables in Run1 and Run2. According to an embodiment, solver 204 calculates a score of the variable of Run1 as the SUM of (Position index of common constraint which contains Run1 Variable in Run1 matrix*Constraint Coefficient of Run1 Variable in that constraint) and calculates a score of the variables of Run2 as the SUM of (Position index of common constraint which contains Run2 Variable in Run2 matrix*Constraint Coefficient of Run2 Variable in that constraint). The position index of a constraint is the index of the constraint's supply chain name in the List of Common Supply Chain Names, generated using matrix diff method 1700, as disclosed above. According to embodiments, only the constraints which are common between Run1 and Run2 are considered to calculate the score of the variable. In addition or as an alternative, solver 204 may perform deep compare activity 1710 for constraints in a similar manner as that for variables. By way of further explanation only and not by way of limitation, the deep compare activity is described with the following example.

Figure 18:
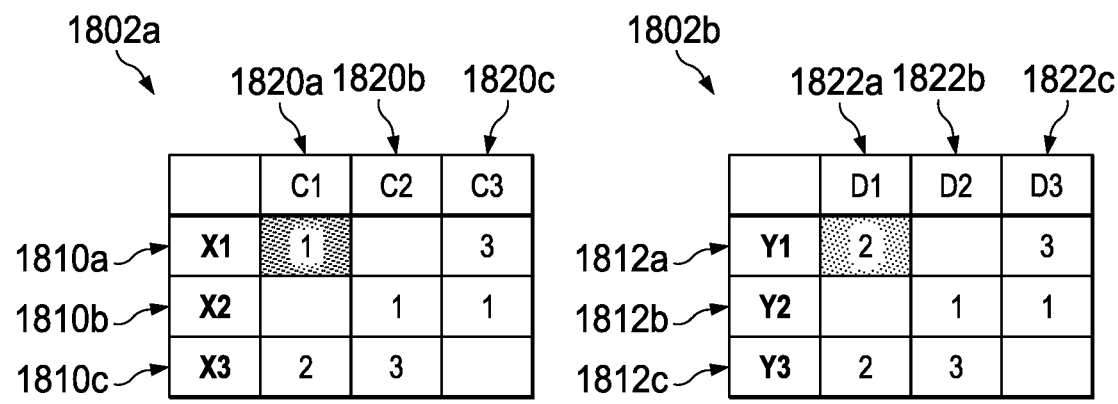
FIG. 18 illustrates a constraint coefficient changes between Run1 and Run2 of an LPP, according to an embodiment.

FIG. 18 illustrates a constraint coefficient changes between Run1 and Run2 of an LPP, according to an embodiment. In this example, a first solving run of an LPP (Run1) is represented by matrix 1802a and a second solving run of an LPP for the same supply chain (Run2) is represented by matrix 1802b. Variables 1810a-1810c (X1, X2, and X3) of matrix 1802a in Run1, and map to variables 1812a-1812c (Y1, Y2, and Y3) of matrix 1802b in Run2. Similarly, constraints 1820a-1820c of matrix 1802a (C1, C2, and C3) in Run1 map to constraints 1822a-1822c of matrix 1802b (D1, D2, and D3) in Run2.

Solver 204 generates list of common variables and common constraints 224 at activity 1708, as disclosed above. In this example, list of common variables and common constraints indicates that variable X1 1810a and variable Y1 1812a is one common pair of variables. At activity 1710, solver 204 checks if the variables are actually common to both Run1 and Run2, or if a coefficient change may have occurred. As shown for matrices 1802a-1802b, the coefficient is changed from 1 to 2 for variable X1 1810a for constraint C1 1820a to variable Y 1812a for constraint D1 1822a. To identify this coefficient change and generate corrected lists 226, solver 204 calculates a score for the common pair of variables, X1 1810a and Y1 1812a at the first constraint C1 1820a and D1 1822a. Solver 204 accesses List of Common Supply Chain Names and calculates two scores:

a score of the variable of Run1 as the SUM of (Position index of common constraint which contains Run1 Variable in Run1 matrix*Constraint Coefficient of Run1 Variable in that constraint); and a score of the variables of Run2 as the SUM of (Position index of common constraint which contains Run2 Variable in Run2 matrix*Constraint Coefficient of Run2 Variable in that constraint).

As disclosed above, the position index of a constraint is the position of the constraint's supply chain name in the List of Common Supply Chain Names. Because the list of Common Supply Chain Names is a list, each of the constraints is given a position, order, or index on the list. According to embodiments, only the constraints which are common between Run1 and Run2 are considered to calculate the score of the variable. Solver 204 then calculates the scores as a sum of the coefficient multiplied by its position number for all common constraints containing the variable. Because the position index of constraints common to Run1 and Run2 is the same, solver 204 compares the scores to generate corrected lists 226 described above and removes the variable pairs from the List of Common Variables if a score for the variable in Run1 is different from its counterpart in Run2.

Continuing the example shown, the coefficient changed from 1 to 2 for variable X1 1810a to variable Y1 1812a at the first constraint 1820a and 1822a, so the score for Run1 will not match the score for Run2. Solver 204 may then remove variable X1 1810a and Y1 1812a from the list of common names and, further, solver 204 will add variable X1 1810a to the list of only Run1 variables and add variable Y1 1812a to the list of only Run2 variables to generate the corrected list of only Run1 variables and the corrected list of only Run2 variables. Solver 204 may then iterate activity 1710 for the remaining variables and constraints on the list of common variables and the list of common constraints for all remaining variables and constraints.

Continuing the example of universal method 1500, after generating the six corrected lists by activity 1710 of matrix diff method 1700, solver 204 generates intermediate matrix 228 and superset matrix 230 using the lists, at activity 1506 of universal method 1500. These matrices 228-230 are used to pass the final solution of Run1 as a warm start for Run2.

Figure 19:
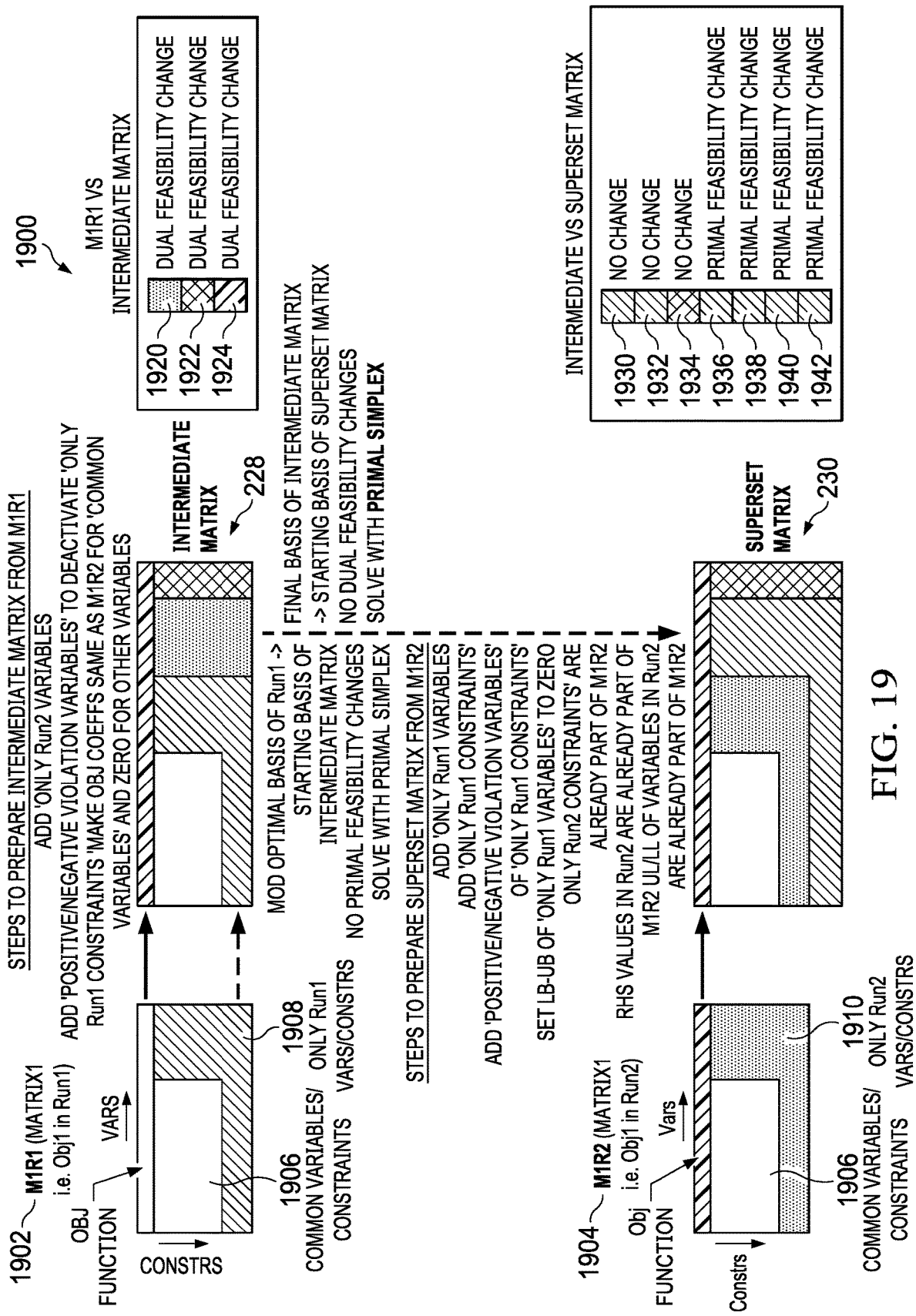
FIG. 19 illustrates a simplified diagram of the intermediate matrix and the superset matrix, according to an embodiment.

FIG. 19 illustrates a simplified diagram 1900 of intermediate matrix 228 and superset matrix 230, according to an embodiment. As disclosed above and as shown, diagram 1900 comprises the LPP for solving the first objective of Run1 may be modeled by LP matrix M1R1 1902 and the LPP for solving the first objective of Run2 may be modeled by LP matrix M1R2 1904.

In diagram 1900, it can be seen that matrix M1R1 1902 and M1R2 1904 share common constraints and variables 1906 while having different sets of constraints and variables unique to each matrix (only Run1 constraints and variables 1908 and only Run2 constraints and variables 1910. Using lists of Common/Only Run1/Only Run2 constraints and variables 224 or corrected lists of Common/Only Run1/Only Run2 constraints and variables 226 as derived in matrix diff method 1700, solver 204 may then construct intermediate matrix 228 and superset matrix 230 from M1R1 1902 and M1R2 1904. Intermediate matrix 228 comprises new violation variables 1920 in Run2 and new variables 1922. For intermediate matrix 228, solver 204 adds only Run2 variables as well as violation variables to remove constraints.

Objective coefficients for each common variable (i.e., a variable which is common between Run1 and Run2) in intermediate matrix 228 are the same as its objective coefficient in M1R2 1904, which is shown by common variables 1924. Objective coefficients for remaining variables in intermediate matrix 228 are zero.

Intermediate matrix 228 may be constructed by adding additional variables and constraints to M1R1 1902. Similarly for superset matrix 230, solver 204 adds the constraints and variables, as well as the violation variables, indicating the superset may be constructed from only the addition of variables and constants to M1R2 1904.

Variables which are only present in Run1 1930, constraints which are only present in Run1 1932, and violation variables of constraints only present in Run1 1934 cause neither primal feasible change nor dual feasibility change between intermediate matrix 228 and superset matrix 230. Lower bound and upper bound of only Run1 variables are set to 0 (primal feasibility change) 1936. 1938 represents variables which are only present in Run2 1938, Right Hand Side (RHS) values of Run2 constraints 1940, and upper limit and lower limit of Run2 variables 1942, comprise primal feasibility changes between intermediate matrix 228 and superset matrix 230.

According to an embodiment and using lists of Common/Only Run1/Only Run2 constraints and variables 224 or corrected lists of Common/Only Run1/Only Run2 constraints and variables 226 as derived in matrix diff method 1700, solver 204 generates intermediate matrix 228 from the first objective LPP of Run1 (i.e. previous run), by adding 'Only Run2 variables', adding positive/negative violations variables which are used to deactivate 'Only Run1 constraints' and changing objective coefficients to first objective of Run2 (i.e. current run).

In addition and again using only lists of Common/Only Run1/Only Run2 constraints and variables 224 or corrected lists of Common/Only Run1/Only Run2 constraints and variables 226 as derived in matrix diff method 1700, solver 204 generates superset matrix 230 from the first objective LPP of Run2 by adding 'Only Run1 variables' with Lower Bound and Upper Bound set to 0, adding 'Only Run1 constraints' and adding positive/negative violation variables which are used to deactivate 'Only Run1 constraints. As disclosed above, generating superset matrix 230 using this method is easier than generating superset matrix 230 from intermediate matrix 228 because it does not require tracking of primal feasibility changes.

At activity 1508, solver 204 solves intermediate matrix 228 with the modified final basis of Run1 as a starting basis with Primal Simplex. As stated above, the changes to the final basis of Run are ΔDF, which means that the modified basis of the first LPP of Run1 is also primal feasible to Intermediate matrix 228. Intermediate matrix 228 is solved with this starting basis using the Primal Simplex method. The optimal basis of intermediate matrix 228 will be dual feasible to superset matrix 230 since superset matrix 230 has only ΔPF compared with intermediate matrix 228.

At activity 1510 of universal method 1500, solver 204 translates the optimal basis of intermediate matrix 228 to derive the starting basis of superset matrix 230. According to embodiments, solver 204 uses basis translation method 2000 (FIG. 20).

Figures 20, 21:
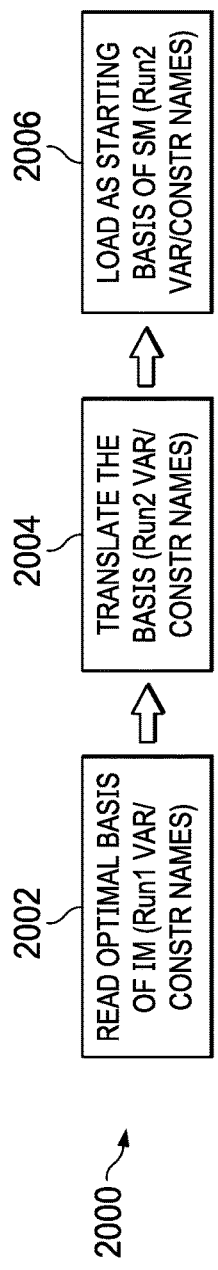
FIG. 20 illustrates a basis translation method, according to an embodiment.
FIG. 21 illustrates a table comparing the method of FIG. 4 with the universal method of FIG. 15, according to an embodiment.

FIG. 20 illustrates basis translation method 2000, according to an embodiment. Because intermediate matrix 228 and superset matrix 230 are derived from different LPPs (e.g., Run1 and Run2), they may have different names for variables and constraints. Accordingly, solver 204 translates the optimal basis of intermediate matrix 228 from Run1 variable and constraint names to Run2 variable and constraint names, in order to apply the optimal basis as the starting basis for superset matrix. According to embodiments, solver 204 uses the mappings between Run1 variable and constraint names to Run2 variable and constraint names as derived in matrix diff method 1700. Basis translation method 2000 begins at activity 2002 when solver 204 reads the optimal basis of intermediate matrix 228, which uses the Run1 variable and constraint names. At activity 2004, solver 204 translates the optimal basis to the Run2 variable and constraint names (using the mappings generated by matrix diff method 1700), and solver 204 loads the translated basis as the starting basis of superset matrix 230, which both uses the Run2 variable and constraint names, at activity 2006.

After loading the translated basis as the starting basis of superset matrix 230, solver 204 solves superset matrix 230 with Dual Simplex, at activity 1512. As disclosed above, superset matrix 230 is equivalent to the LPP of Run2 for the first objective. Accordingly, solving superset matrix 230 is equivalent to solving the LPP of Run2 for the first objective.

At activity 1714, solver 204 solves the second objective, Obj2, of the LPP of Run2 and each subsequent objective by changing the objective function of superset matrix 230, fixing variables after each objective solve, and iteratively solving each objective until a final objective is solved. According to embodiments, solver 204 continues to iteratively solve each subsequent objective using primal simplex method with the starting basis as the optimal basis of last objective, applying variable fixing bound changes after solving each objective to preserve the objective value of the solved objective, changing the objective function to the next objective in the hierarchy, and repeating this procedure until reaching the last objective of Run2.

The solution of the final objective gives the solution for Run2, at activity 1516. The solution of the final objective for Run2 gives the optimal solution of the current run for the LPP. Solver 204 may use the solution of the final objective to generate a supply chain plan, as disclosed above.

FIG. 21 illustrates table 2100 comparing method 400 with universal method 1500, according to an embodiment. The table comprises test run number (Sr. No) 2102, dataset 2104, method 400 solve time 2106, universal method 1500 solve time 2108, improvement (percentage of time) 2110, and improvement (multiplier of the quantity of times improvement in solve time from method 400 to universal method 1500) 2112. The testing was performed using IBM CPLEX Python API, to perform the following experiment:

Solve Multi-Objective LPP in a Base Run (i.e. Run1) with method 400;

Solve Multi-Objective LPP in a New Run (i.e. Run2) with method 400;

Solve Multi-Objective LPP in New Run with universal method 1500 using solution information of the Base Run; and Compare runtimes, objective values, and the quantity of iterations between method 400 and universal method 1500 to calculate solve time improvements.

Based on these results, universal method 1500 solves the multi-objective hierarchical LPP with improved solve time for most data sets, with time savings in the range of 12% to 66%, which validates universal method 1500 as an improvement over method 400 in most instances.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system for reducing a time to re-run computer solves of a supply chain planning problem modeled as a multi-objective hierarchical linear programming problem, comprising:
 a computer, comprising a processor and memory, the computer configured to:
   receive supply chain input data for the supply chain planning problem;
   model the supply chain planning problem as a multi-objective hierarchal linear programming problem having a first Run1 objective and at least one additional Run1 objective, and based, at least in part, on the supply chain input data;
   solve a base run of the multi-objective hierarchical linear programming problem for the first Run1 objective and the at least one additional Run1 objective;
   receive one or more changes to the supply chain input data;
   model a second supply chain planning problem based, at least in part, on the one or more changes to the supply chain input data, the second supply chain planning problem modeled as a second multi-objective hierarchal linear programming problem having a first Run2 objective and at least one additional Run2 objective;
   generate a superset matrix from the second multi-objective hierarchical linear programming problem and the first Run2 objective, wherein the superset matrix, at least in part, forms a bridge linking the base run to the second multi-objective hierarchal linear programming problem and wherein the bridge reduces a run time to solve the second multi-objective hierarchical linear programming problem;
   solve the second supply chain planning problem for the first Run2 objective and the at least one additional Run2 objective;
   generate a supply chain plan comprising the one or more changes to the supply chain input data by converting a solution of the second supply chain planning problem; and
   instruct automated machinery to adjust one or more inventory levels at one or more stocking points based on the supply chain plan.

2. The system of claim 1, wherein the computer is further configured to:
 generate the superset matrix and an intermediate matrix based, at least in part, on a list of constraints and variables common to both the first supply chain planning problem and the second supply chain planning problem, a list of constraints and variables only present in the first supply chain planning problem, and a list of constraints and variables present in the second supply chain planning problem.

3. The system of claim 1, wherein the computer is further configured to:
 generate an intermediate matrix from the first Run1 objective of the first supply chain planning problem by adding variables present in only the second supply chain planning problem, adding positive and negative violation variables to deactivate constraints present in only the first supply chain planning problem, and modifying objective coefficients to the first Run2 objective.

4. The system of claim 1, wherein the computer is further configured to:
 generate the superset matrix from the first Run2 objective of the second supply chain planning problem by adding variables present in only the first supply chain planning problem and adding positive and negative violation variables to deactivate constraints present in only the first supply chain planning problem.

5. The system of claim 1, wherein the computer is further configured to:
 generate a base plan by converting a solution of the base run of the multi-objective hierarchical linear programming problem.

6. The system of claim 1, wherein the computer is configured to generate the superset matrix from the second multi-objective hierarchical linear programming problem and the first Run2 objective by scoring a pair of variables common to Run1 and Run2.

7. The system of claim 6, wherein scoring the pair of variables common to Run1 and Run2 comprises:
 calculating a score of the variables of Run1 as the sum of a position index of a common constraint which contains the Run1 variable in a Run1 matrix multiplied by a constraint coefficient of the Run1 Variable for that constraint; and
 calculating a score of the variables of Run2 as the sum of the position index of the common constraint which contains the Run2 variable in a Run2 matrix multiplied by a constraint coefficient of the Run2 variable for that constraint, wherein the position index of the common constraint is the index of the supply chain name of the common constraint in a list of common supply chain names.

8. A method for reducing a time to re-run computer solves of a supply chain planning problem modeled as a multi-objective hierarchical linear programming problem, comprising:
 receiving, by a computer comprising a processor and memory, supply chain input data for the supply chain planning problem;
 modeling, by the computer, the supply chain planning problem as a multi-objective hierarchal linear programming problem having a first Run1 objective and at least one additional Run1 objective, and based, at least in part, on the supply chain input data;
 solving, by the computer, a base run of the multi-objective hierarchical linear programming problem for the first Run1 objective and the at least one additional Run1 objective;
 receiving, by the computer, one or more changes to the supply chain input data;
 modeling, by the computer, a second supply chain planning problem based, at least in part, on the one or more changes to the supply chain input data, the second supply chain planning problem modeled as a second multi-objective hierarchal linear programming problem having a first Run2 objective and at least one additional Run2 objective;
 generating, by the computer, a superset matrix from the second multi-objective hierarchical linear programming problem and the first Run2 objective, wherein the superset matrix, at least in part, forms a bridge linking the base run to the second multi-objective hierarchal linear programming problem and wherein the bridge reduces a run time to solve the second multi-objective hierarchical linear programming problem;

solving, by the computer, the second supply chain planning problem for the first Run2 objective and the at least one additional Run2 objective;

generating, by the computer, a supply chain plan comprising the one or more changes to the supply chain input data by converting a solution of the second supply chain planning problem; and instructing, by the computer, automated machinery to adjust one or more inventory levels at one or more stocking points based on the supply chain plan.

9. The method of claim 8, further comprising:
generating, by the computer, the superset matrix and an intermediate matrix based, at least in part, on a list of constraints and variables common to both the first supply chain planning problem and the second supply chain planning problem, a list of constraints and variables only present in the first supply chain planning problem, and a list of constraints and variables present in the second supply chain planning problem.

10. The method of claim 8, further comprising:
generating, by the computer, an intermediate matrix from the first Run1 objective of the first supply chain planning problem by adding variables present in only the second supply chain planning problem, adding positive and negative violation variables to deactivate constraints present in only the first supply chain planning problem, and modifying objective coefficients to the first Run2 objective.

11. The method of claim 8, further comprising:
generating, by the computer, the superset matrix from the first Run2 objective of the second supply chain planning problem by adding variables present in only the first supply chain planning problem and adding positive and negative violation variables to deactivate constraints present in only the first supply chain planning problem.

12. The method of claim 8, further comprising:
generating, by the computer, a base plan by converting a solution of the base run of the multi-objective hierarchical linear programming problem.

13. The method of claim 8, wherein generating the superset matrix from the second multi-objective hierarchical linear programming problem and the first Run2 objective comprises scoring a pair of variables common to Run1 and Run2.

14. The method of claim 13, wherein scoring the pair of variables common to Run1 and Run2 comprises:
calculating, by the computer, a score of the variables of Run1 as the sum of a position index of a common constraint which contains the Run1 variable in a Run1 matrix multiplied by a constraint coefficient of the Run1 Variable for that constraint; and
calculating, by the computer, a score of the variables of Run2 as the sum of the position index of the common constraint which contains the Run2 variable in a Run2 matrix multiplied by a constraint coefficient of the Run2 variable for that constraint, wherein the position index of the common constraint is the index of the supply chain name of the common constraint in a list of common supply chain names.

15. A non-transitory computer-readable medium embodied with software for reducing a time to re-run computer solves of a supply chain planning problem modeled as a multi-objective hierarchical linear programming problem, the software when executed:

receives supply chain input data for the supply chain planning problem;

models the supply chain planning problem as a multi-objective hierarchal linear programming problem having a first Run1 objective and at least one additional Run1 objective, and based, at least in part, on the supply chain input data;

solves a base run of the multi-objective hierarchical linear programming problem for the first Run1 objective and the at least one additional Run1 objective;

receives one or more changes to the supply chain input data;

models a second supply chain planning problem based, at least in part, on the one or more changes to the supply chain input data, the second supply chain planning problem modeled as a second multi-objective hierarchal linear programming problem having a first Run2 objective and at least one additional Run2 objective;

generates a superset matrix from the second multi-objective hierarchical linear programming problem and the first Run2 objective, wherein the superset matrix, at least in part, forms a bridge linking the base run to the second multi-objective hierarchal linear programming problem and wherein the bridge reduces a run time to solve the second multi-object hierarchical linear programming problem;

solves the second supply chain planning problem for the first Run2 objective and the at least one additional Run2 objective;

generates a supply chain plan comprising the one or more changes to the supply chain input data by converting a solution of the second supply chain planning problem; and instructs automated machinery to adjust one or more inventory levels at one or more stocking points based on the supply chain plan.

16. The non-transitory computer-readable medium of claim 15, wherein the software when executed further:
generates the superset matrix and an intermediate matrix based, at least in part, on a list of constraints and variables common to both the first supply chain planning problem and the second supply chain planning problem, a list of constraints and variables only present in the first supply chain planning problem, and a list of constraints and variables present in the second supply chain planning problem.

17. The non-transitory computer-readable medium of claim 15, wherein the software when executed further:
generates an intermediate matrix from the first Run1 objective of the first supply chain planning problem by adding variables present in only the second supply chain planning problem, adding positive and negative violation variables to deactivate constraints present in only the first supply chain planning problem, and modifying objective coefficients to the first Run2 objective.

18. The non-transitory computer-readable medium of claim 15, wherein the software when executed further:
generates the superset matrix from the first Run2 objective of the second supply chain planning problem by adding variables present in only the first supply chain planning problem and adding positive and negative violation variables to deactivate constraints present in only the first supply chain planning problem.

19. The non-transitory computer-readable medium of claim 15, wherein the software when executed further:
  generates a base plan by converting a solution of the base run of the multi-objective hierarchical linear programming problem.

20. The non-transitory computer-readable medium of claim 19, wherein the software when executed generates the superset matrix from the second multi-objective hierarchical linear programming problem and the first Run2 objective by scoring a pair of variables common to Run1 and Run2.

* * * * *